United States Patent
Nagatomi et al.

(10) Patent No.: US 6,975,414 B2
(45) Date of Patent: Dec. 13, 2005

(54) ELECTROPHOTOGRAPHIC RECORDING DEVICE

(75) Inventors: Tsutomu Nagatomi, Kawasaki (JP); Takeo Kojima, Kobe (JP)

(73) Assignee: Fujitsu Limited, Kawasaki (JP)

(*) Notice: Subject to any disclaimer, the term of this patent is extended or adjusted under 35 U.S.C. 154(b) by 887 days.

(21) Appl. No.: 09/760,665

(22) Filed: Jan. 17, 2001

(65) Prior Publication Data

US 2002/0027669 A1 Mar. 7, 2002

(30) Foreign Application Priority Data

Sep. 5, 2000 (JP) .............................. 2000-268093

(51) Int. Cl.⁷ .............................. G06F 15/00; G03F 3/08
(52) U.S. Cl. .................. 358/1.13; 358/1.9; 358/506; 358/518; 358/519; 358/520; 358/521; 358/522; 358/523; 358/527; 358/530
(58) Field of Search .................. 358/1.13, 518–523, 358/1.9, 506, 527, 531

(56) References Cited

U.S. PATENT DOCUMENTS

| | | | |
|---|---|---|---|
| 5,594,558 A | * | 1/1997 | Usami et al. ............ 358/518 |
| 6,023,527 A | * | 2/2000 | Narahara ............... 382/167 |
| 6,751,346 B2 | * | 6/2004 | Shimizu ............... 382/162 |

FOREIGN PATENT DOCUMENTS

JP 11272037 A * 10/1999 .......... G03G/15/01

* cited by examiner

*Primary Examiner*—Edward Coles
*Assistant Examiner*—Chan S. Park
(74) *Attorney, Agent, or Firm*—Armstrong, Kratz, Quintos, Hanson & Brooks, LLP

(57) ABSTRACT

In a recording device, electrostatic recording units of Y, M, C and K are arranged along the direction of the feed of a recording sheet by a belt unit. The device forms latent images corresponding to image data by optical scanning of an exposure device onto a rotating photosensitive drum, develops the latent images with toner components having different colors, and then transfers the developed images onto the recording sheet on the belt unit. A color matching processing unit performs color matching processing including color slippage correction of different color images. An automatic color matching mode processing unit works the color matching processing unit when conditions beforehand decided in the state that an automatic correction mode is set up are realized. A manual color matching mode processing unit controls the color matching processing unit when the manual color matching mode processing unit recognizes operator's manual color matching instructing operation in the state that a non-correction mode is set up.

10 Claims, 17 Drawing Sheets

FIG. 4A
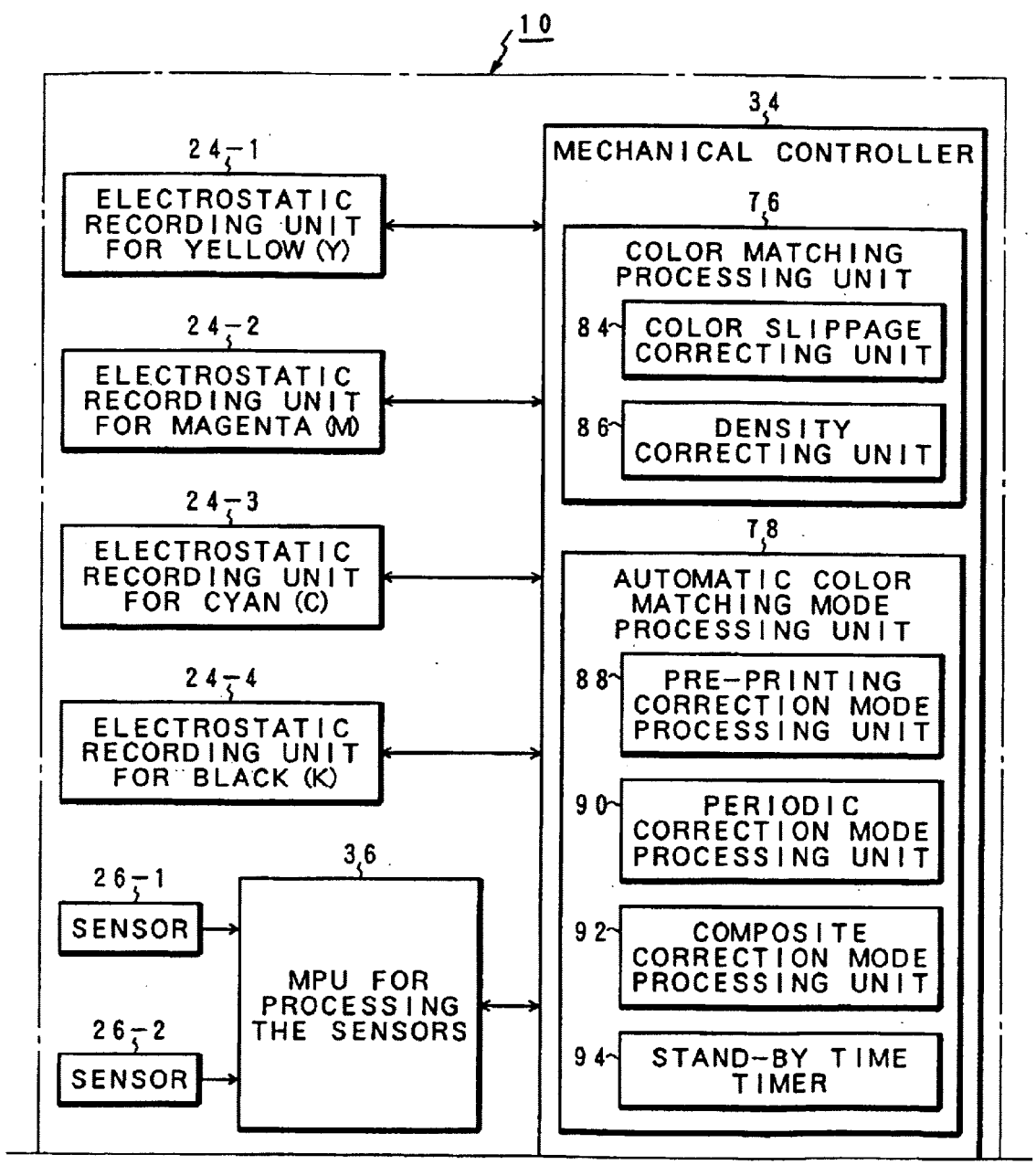

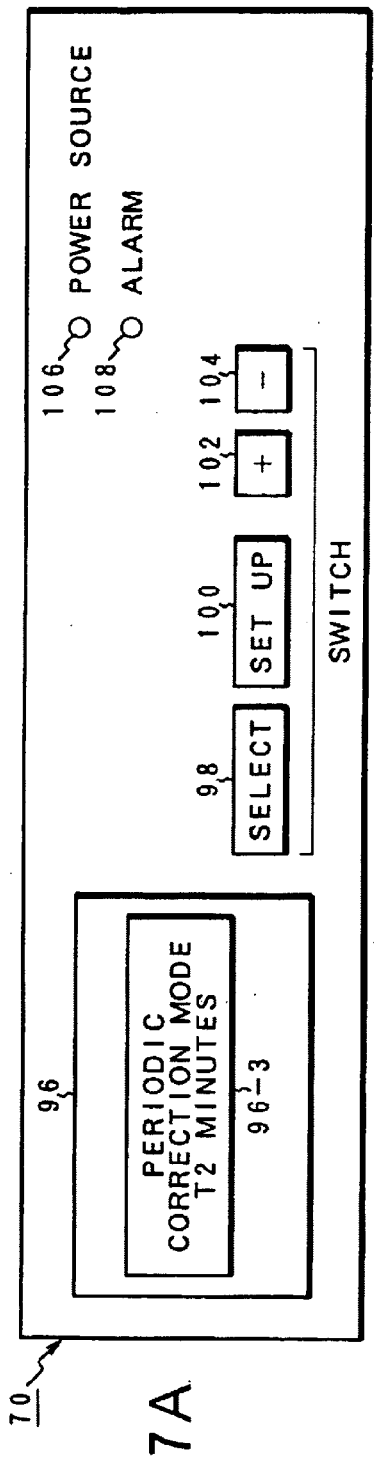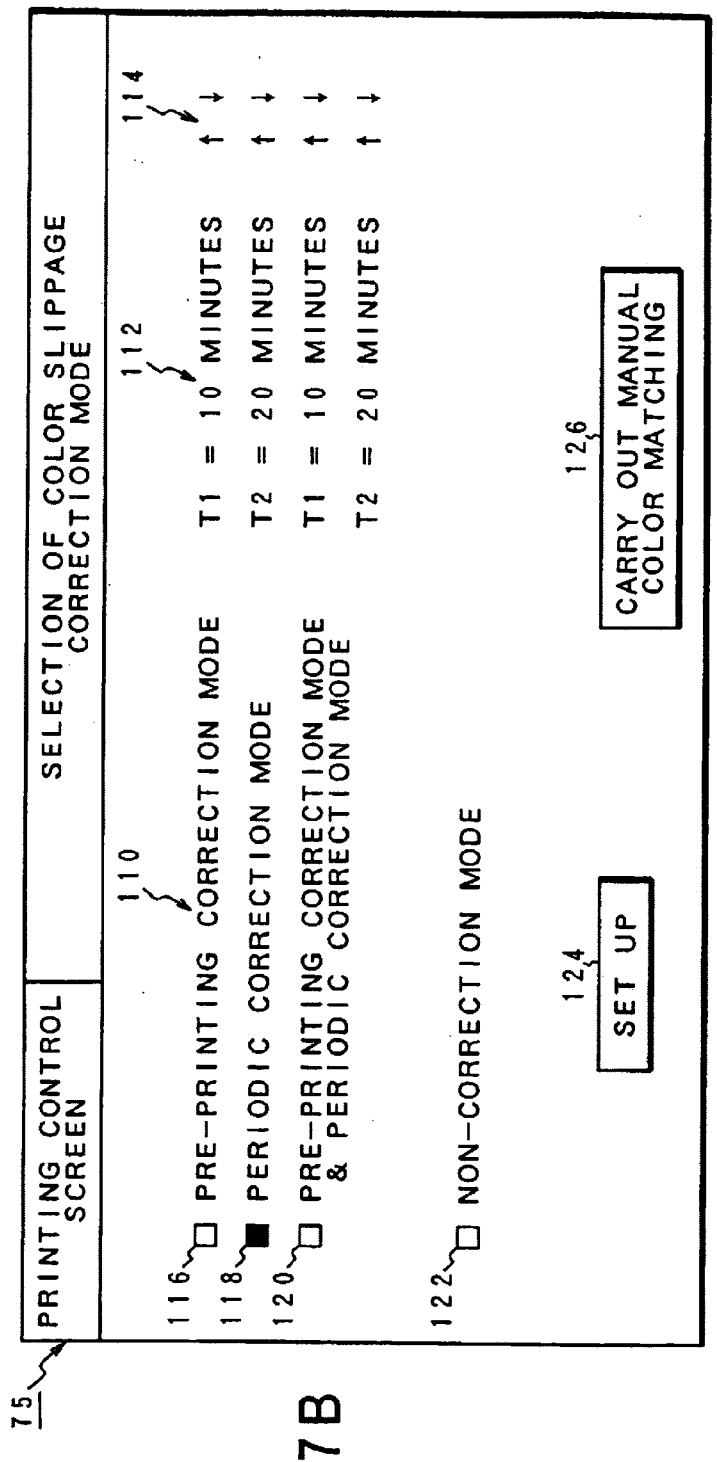
FIG. 7A
FIG. 7B

FIG. 12A
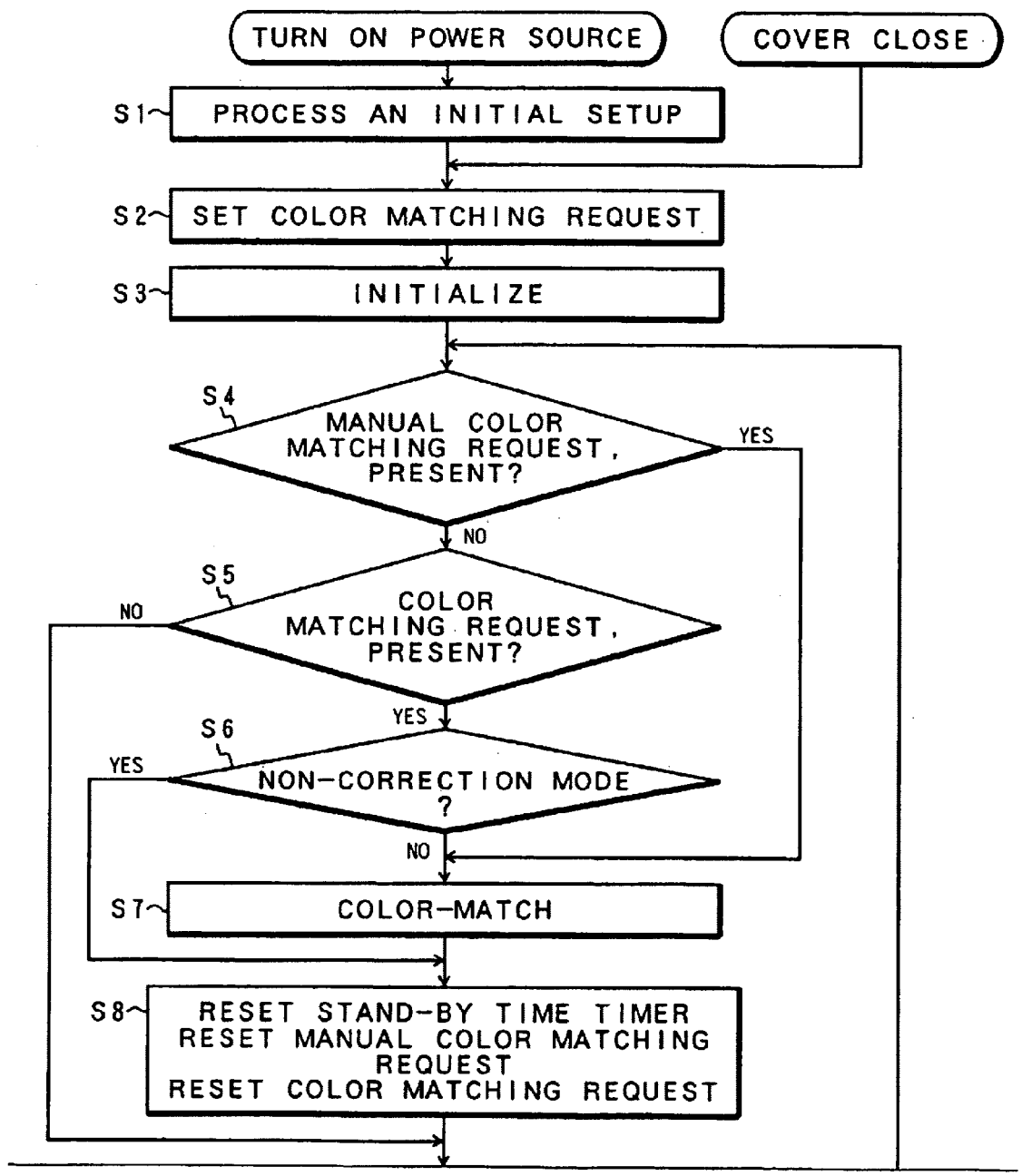

FIG. 13A
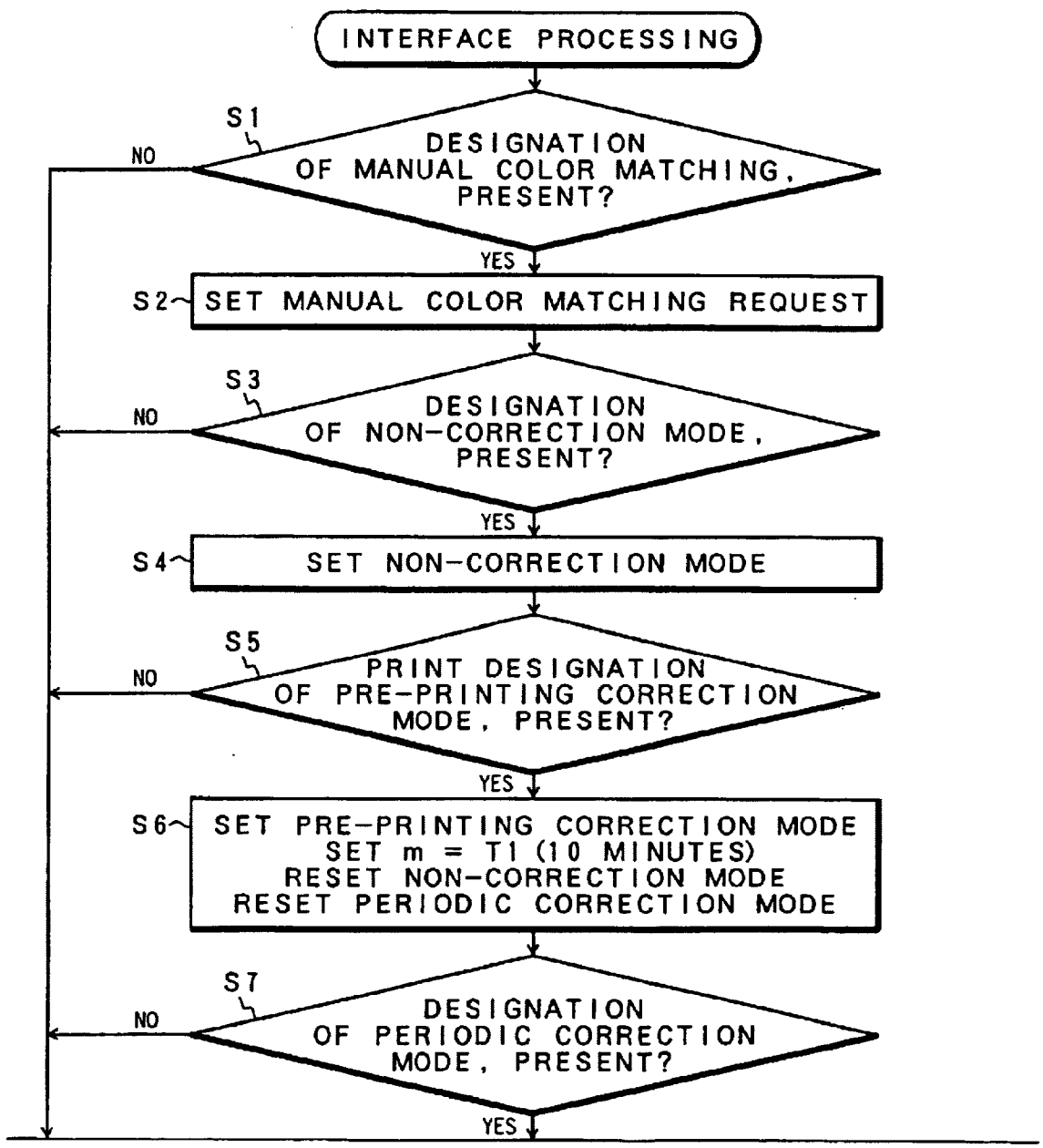

ELECTROPHOTOGRAPHIC RECORDING DEVICE

BACKGROUND OF THE INVENTION

1. Field of the Invention

The present invention relates to an electrophotographic recording device, such as a printer for forming a multicolor image composed of a combination of different color images, and more particularly, to an electrophotographic recording device for printing a full color image by superimposition transfer of Y, M, C and K color images by means of plural electrostatic recording units. Furthermore, the present invention relates to an electrophotographic recording device having a color matching function for adjusting color slippage and density of a color image into an optimal state.

2. Description of the Related Art

Hitherto, ink-jet type or electrophotographic type printers have been generally spread as color printing devices using electrophotographic recording. In such color printing devices, electrostatic recording units for 4 colors, i.e., black (K), cyan (C), magenta (M), and yellow (Y), are tandem-arranged along a recording paper feed direction. The 4-color electrostatic recording units scan a photosensitive drum optically on the basis of image data to form latent images. The latent images are developed with color toners in a developing unit, and then the latent images are superimposed and transferred, in the order of yellow (Y), magenta (M), cyan (C) and black (K), onto recording paper that is fed at a constant speed. At last, the toners are heated and fixed through a fixing unit. In the printing device having a structure wherein Y, M, C and K electrostatic recording units are tandem-arranged along a recording paper feed direction, in order to improve color printing quality, it is essential to reduce positional slippage of toner images transferred onto recording paper that is being fed by the respective electrostatic recording units to heighten the precision of color matching. Therefore, in the tandem type printing device, toner marks are transferred to its feeding belt and then its sensors read the marks. The writing timing of an LED, a laser diode or the like constituting an exposure device is then changed to perform color matching processing for correcting color slippage and toner densities (U.S. patent application Ser. No. 09/234,455). The correction of the color slippage and the toner densities in such a color printing device, particularly a tandem type color printing device as described above, is performed by either automatic correction function which acts automatically, for example, when the power source of the printing device is turned on or when the cover for exchanging toners is opened or shut, or manual correction function that on the basis of test printing results an operator inputs correction values from an operation panel to make correction without automatic correction function.

FIG. 1 is a flowchart of color matching processing based on automatic correction function in the prior art. Conditions such as correction operation timing are beforehand decided at the stage of forwarding from a factory, and cannot be set by an operator. The automatic correction function usually acts when the power source of a printing device is turned on or when the cover thereof is opened or shut. When the power source of the printing device is turned on, an initial setup is performed in step S1. The initial setup includes the initial setup of its hardware, reading of various set values stored in its nonvolatile memory, and check of abnormality of its circuit (self diagnosis). Subsequently, in step S2, a color matching request is set since color matching processing is necessary at the time of use-start of the device based on turning-on of the power source. When the cover is closed after the cover is opened and the toner unit is exchanged, a color matching request is set in step S2. This is because color matching is necessary against the positional slippage of the LED head of the device. In step S3, initial processing in the printing mechanism unit is performed, in order to perform initial action of printing process and so on to make printing possible. When printing can be performed after the end of the initial processing, the present algorithm goes to a loop of waiting for printing (steps S4–S7). In the top step S4 of this loop of waiting for printing, it is checked whether or not there is a color matching request. If the color matching request is present, color matching processing is performed in step S5. That is, color matching processing is performed only one time in step S5 immediately after the initial processing in step S3. After the color matching processing, it is checked in step S6 whether or not there is a printing request. If the printing request is present, the algorithm goes to step S7 to perform printing. On the other hand, in the case that an alarm breaks out during the processing of the printing wait loop S4–S7, non-illustrated alarm processing is performed. In the alarm processing, it is repeatedly checked whether or not causes for the abnormality are removed. When all of the causes for the abnormality are removed, the algorithm is restored from the alarm processing to the printing wait loop. In the case that during the outbreak of the alarm the cover is being opened, the algorithm goes from the cover close stage to the printing wait loop through steps S2 and S3. In this case, the color matching request is set up in step S2. Therefore, the algorithm advances from step 4 to step S5 to carry out color matching processing. However, in the case that the cover is not opened during the outbreak of the alarm, the algorithm returns to the top of the printing wait loop (steps S4–S7) without performing the setup of the color matching request in step S2 and the initial processing in step S3 so as to perform the above-mentioned processing again. In this case, no color matching request is set, so that no color matching in the step S5 is performed. However, in the automatic correction mode, such conventional color matching processing is automatically performed whenever the power source is turned on or whenever the cover is closed. Thus, much time is required for the color matching, so that throughput drops. In the case of printing that does not require precision, for example, test printing, a problem that it takes too much time until the result of the printing is checked arises. On the other hand, all operations are left in the charge of an operator in the manual correction mode. Thus, even if color slippage is generated, no color matching is carried out unless the operator becomes aware of it. Color slippage or change in the density of toner is easily caused by change in the internal temperature in the printing device; however, no color matching is performed unless the operator becomes aware of the change in the internal temperature. Thus, an entire manual correction mode has a problem that color slippage is enlarged as a result of the exchange of the toner or change in the internal temperature. Against the problem of the enlargement of color slippage based on the change in the internal temperature, in a printing device a temperature sensor is set up to perform color matching correction operation on the basis of temperature data from the sensor (JP Publication Number 8286566). However, the relationship between the change in the internal temperature and the amount of color slippage vary dependently on use environment of the printing device, the frequency of printing, and so on. Even if the relationship between the change in the temperature and timing of color matching is qualitatively decided, the color matching operation becomes insufficient depending on the situation so that the quantity of color slippage increases. Contrarily, the frequency of the color matching operation becomes high, causing a problem that throughput drops. Furthermore, the temperature sensor and a control unit for the sensor are mounted so that costs rise. A problem based on malfunction of the temperature sensor also arises.

SUMMARY OF THE INVENTION

According to the present invention, provided is a convenient electrophotographic recording device attaining correction with color matching precision suitable for operator's purpose of the use of the device.

The subject of the electrophotographic recording device of the present invention is any electrophotographic recording device using toner components having different colors. This electrophotographic recording device comprises, for example, a belt unit which absorb a recording sheet thereon and feeding it at a constant speed; electrostatic recording units, arranged along the direction of the feed of the recording sheet, and form latent images corresponding to image data by optical scanning of exposure devices onto rotating photosensitive drums, developing the latent images with toner components having different colors, and then transferring the developed images onto the recording sheet on the belt unit; a color matching processing unit which perform color matching processing including color slippage correction of different color images. In the present invention, such an electrophotographic recording device is characterized by comprising an automatic color matching mode processing unit which work the color matching processing unit when conditions beforehand decided in the state that an automatic correction mode is set up are realized; and a manual color matching mode processing unit which controls the color matching processing unit when this unit recognizes an operator's manual color matching instructing operation in the state that a non-correction mode is set up. In the case that mono color printing is mainly performed or an image having patterns in which no notice is taken of color slippage, for example, for check of layout, is printed, no color matching processing is performed by setting the non-correction mode in the electrophotographic recording device of the present invention even if the power source is turned on. A first printed matter is promptly obtained, and printing wait time is made short. In the automatic correction mode, the time interval of color matching processing, as a condition of automatic correction, can be changed. By setting the time interval to a small value, it is possible to attain high-precision color slippage correction wherein effect of the change in the temperature is not easily produced. If the time interval of color matching processing is set to a large value, it is possible to reduce the amount of toners used for transferring toner marks for detecting color slippage onto the belt.

The automatic color matching mode processing unit comprises a pre-printing correction mode, a periodic correction mode, and a composite correction mode including the pre-printing correction mode and the periodic correction mode, any one of which is selected by operator's operation. The detail of the processing in the pre-printing correction mode is as follows. In the case of receipt of a printing request, printing is started without working the color matching processing unit when elapsed time Tw from the preceding color matching processing is below a given time m (for example, T1=10 minutes); and when the elapsed time Tw is not less than the given time m, the color matching processing unit is worked and subsequently printing is started. When the automatic color matching mode processing unit recognizes selection of the pre-printing correction mode by the operator, this unit works the color matching processing unit before start of printing in the case of receipt of a printing request. This pre-printing correction mode is suitable for cases that constantly require printed results with high-precision color slippage correction. When the automatic color matching mode processing unit recognizes selection of the periodic correction mode by the operator, this unit works the color matching processing unit, in a printing wait state, whenever the elapsed time Tw from the preceding color matching processing reaches a given periodic time n (for example, T2=20 minutes). According to this periodic correction mode, printing wait time becomes relatively long. This mode is suitable for cases requiring printed results with high-precision color slippage correction. In the case that the automatic color matching mode processing unit recognizes selection of the composite correction mode by the operator, at the time of receiving a printing request this unit works the color matching processing unit before start of printing; and this unit works the color matching processing unit, in a printing wait state, whenever the elapsed time Tw from the preceding color matching processing reaches a given periodic time n (for example, T2=20 minutes). The manual color matching mode processing unit recognizes ml operator's manual color matching instructing operation, this unit controls the color matching processing unit forcibly even if the mode of the automatic color matching mode processing unit is selected. Therefore, even in the automatic correction mode, the operator can perform manual color matching correction at any time without canceling the automatic correction mode when the operator watches printed results to judge that color matching processing is necessary. The color matching processing unit performs density correction of the respective color images designated by the operator, as well as color slippage correction of the different color images. In other words, in either of the automatic correction mode or the non-correction mode of color matching processing, it is possible to perform not only color slippage correction but also density correction for adjusting the densities of the toners dependently on density correction conditions set at this time. The device of the present invention may comprise an operator operation panel for performing mode selection operation for the automatic color matching mode processing unit, and manual color matching designation operation for the manual color matching processing unit. The device of the present invention may comprises an interface processing unit which perform mode selection operation for the automatic color matching mode processing unit through a screen of a terminal of an external unit connected to a network, and receive and process a request of manual color matching designation operation for the manual color matching processing unit 80.

The above and other objects, features, and advantages of the present invention will become more apparent from the following detailed description with reference to the drawing.

BRIEF DESCRIPTION OF THE DRAWINGS

FIGS. 4A and 4B are block views of a structure for performing the color matching processing according to the present invention;

FIGS. 7A and 7B are explanatory diagrams of a periodic correction mode according to the present invention, and a printing control screen;

FIGS. 12A and 12B are flowcharts of color matching processing according to the present invention, corresponding to the mode setup shown in FIGS. 9A and 9B.

DETAILED DESCRIPTION OF THE PREFERRED EMBODIMENTS

Figure 1:
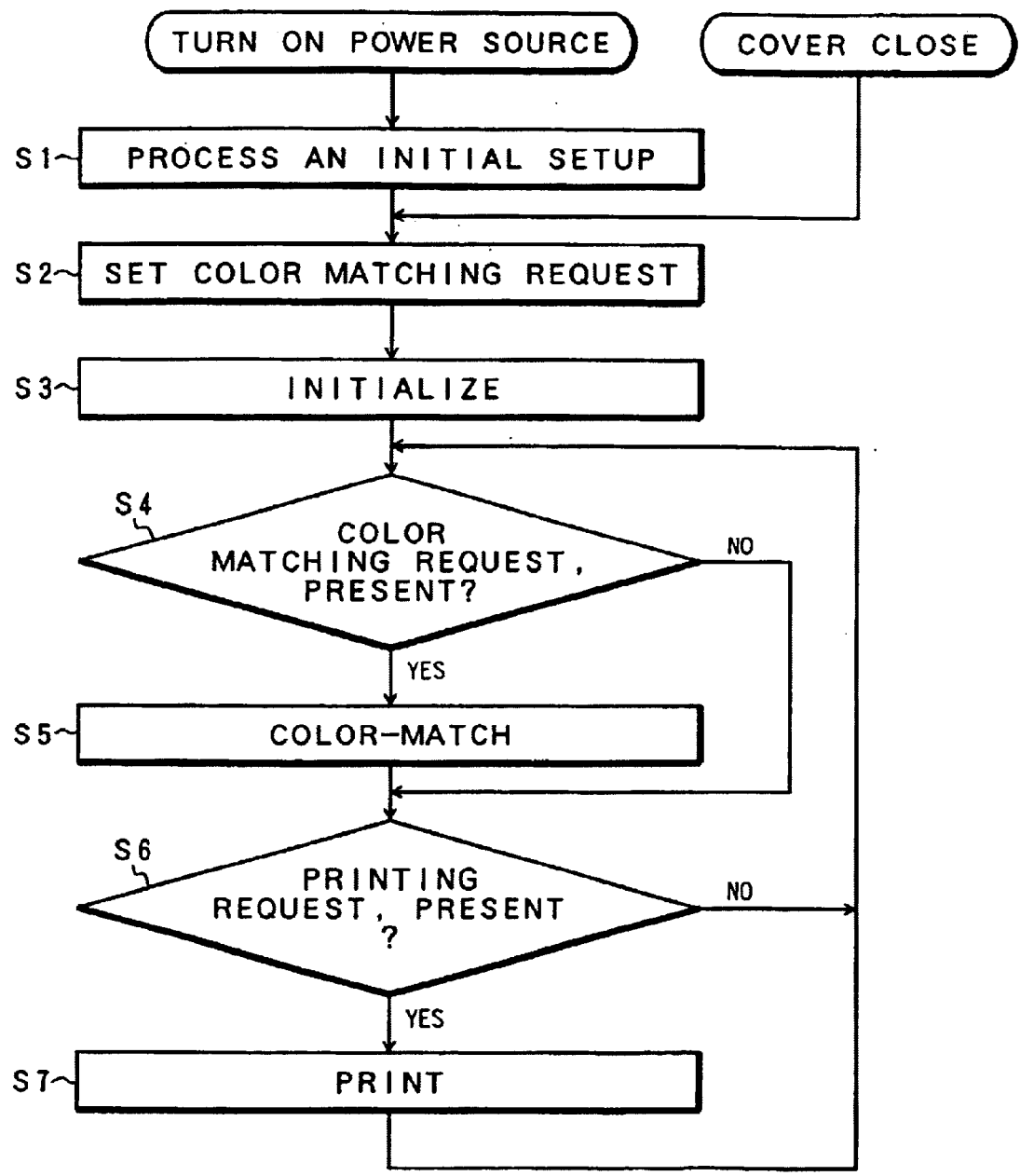
FIG. 1 is a flowchart of conventional color matching processing when the power source of a printing device is turned on or the cover thereof is closed.
Figure 2:
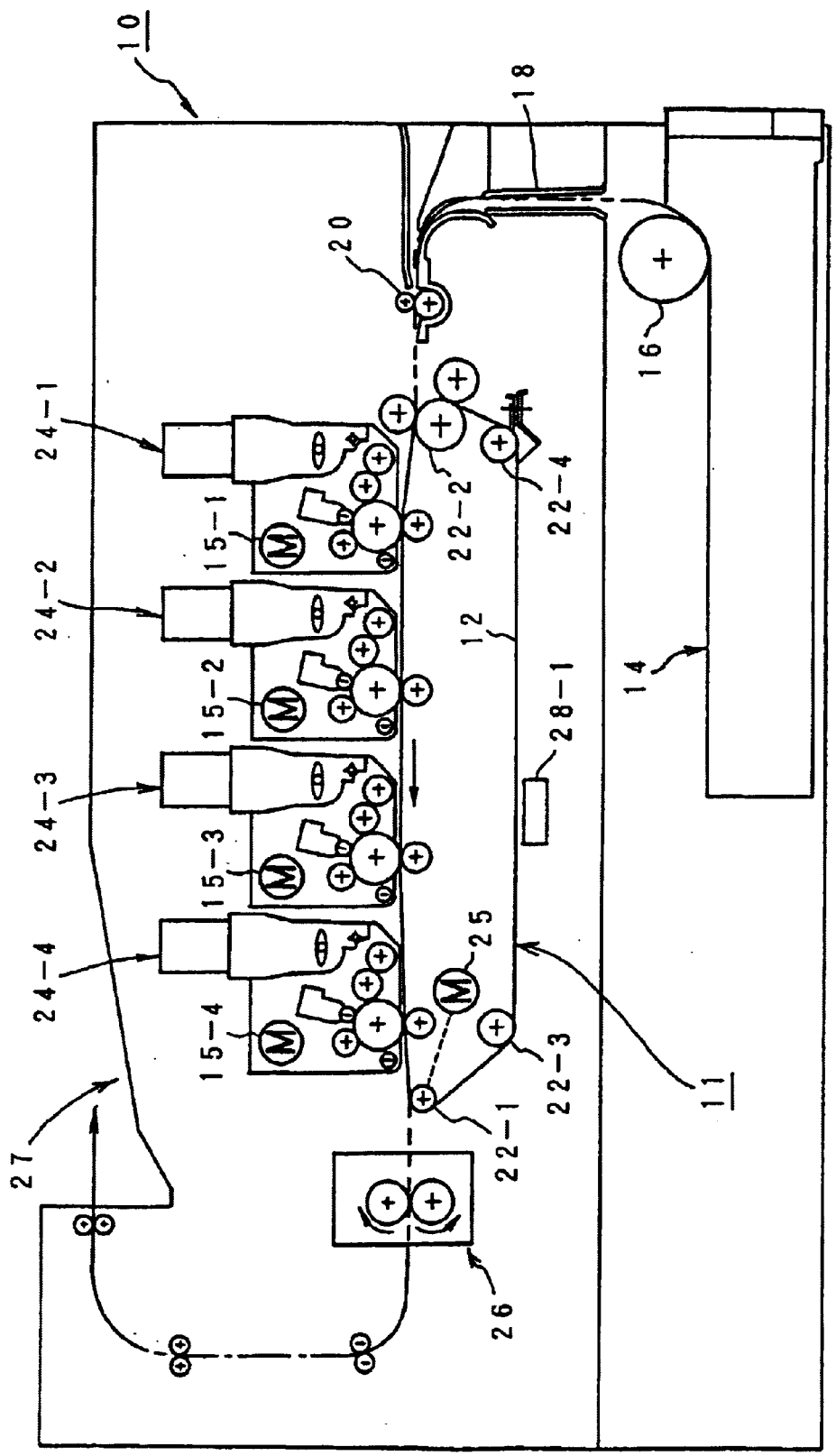
FIG. 2 is an explanatory diagram of the internal structure of a printing device of the present invention.

FIG. 2 shows the internal structure of a printing device, which is an embodiment of the electrophotographic recording device having color matching processing function. In a color printer 10, a convey belt unit 11 for conveying a recording medium, for example, a recording sheet is set up. The convey belt unit 11 has an endless belt 12, which is made of a flexible dielectric material, for example, a suitable synthetic resin and can freely be rotated. The endless belt 12 is stretched around four rollers 22-1, 22-2, 22-3 and 22-4. The roller 22-1 functions as a driving roller, and a non-illustrated driving mechanism of the roller 22-1 moves the endless belt 12 counterclockwise (in the direction indicated by an arrow) at a constant speed, for example, 57 mm/s. The driving roller 22-1 also functions an AC removing roller for removing charges from the endless belt 12. The roller 22-2 functions as a trailing roller, and also functions as a charging roller for giving charges to the endless belt 12. The rollers 22-3 and 22-4 function as guide rollers, and are arranged near the driving roller 22-1 and the trailing roller 22-2. The upper running plane of the endless belt between the trailing roller 22-2 and the driving roller 22-1 makes a passage for moving a recording sheet. The recording sheets are stored in a hopper 14, and are let out one by one from the top of the hopper 14 by a pickup roller 16. The recording sheet let out by the pickup roller 16 passes through a recording sheet guide passage 18 and is introduced from the trailing roller 22-2 side of the endless belt 12 to the recording sheet moving passage of the endless belt 12 by a pair of recording sheet feeding rollers 20, and is then discharged from the driving roller 22-1. Since the endless belt 12 is charged by the trailing roller 22-2, the recording sheet adsorbs electrostatically on the endless belt 12 when the recording sheet is introduced from the trailing roller 22-2 side to the recording sheet moving passage. As a result, the positional slippage of the moving recording sheet can be prevented. On the other hand, since the driving roller 22-1 at the discharging side functions as a charge removing roller, charges are removed from the endless belt 12 at the position where the belt 12 contacts the driving roller 22-1. Thus, charges are removed from the recording sheet when the sheet passes on the driving roller 22-1, so that the sheet is easily exfoliated from the endless belt 12 and is discharged without being wound around the belt. In the body of the device 10, four Y, M, C and K electrostatic recording units 24-1, 24-2, 24-3 and 24-4 are arranged. They are a tandem structure wherein along the recording sheet moving passage, which is the upper plane of the endless belt 12, between the trailing roller 22-2 and the driving roller 22-1, these units are in series arranged in the order of Y, M, C and K from the upstream side thereof to the downstream side thereof. The electrostatic recording units 24-1 to 24-4 use a yellow toner component (Y), a magenta toner component (M), a cyan toner component (C) and a black toner component (K), respectively, as developers. Except this matter, these units have the same structure. Therefore, the electrostatic recording units 24-1 to 24-4 successively transfer a yellow toner image, a magenta toner image, a cyan toner image and a black toner image in a superimposition form on the recording sheet that is moving along the recording sheet moving passage, which is the upper plane of the endless belt 12, so as to form a full color toner image. Each of the units 24-1 to 24-4 is furnished with a pre-charger, an LED array functioning as an exposure device, a toner developing unit, an electrostatic transfer roller, a toner cleaner and so on, around a photosensitive drum, as is well known, to perform electrostatic photo printing according to electrophotographic process. The recording sheet, on which a full color image is formed by superimposition transfer of the toner images of four colors Y, M, C and K by means of the electrostatic recording units 24-1 to 24-4, is fed out from the driving roller 22-1 side to a heat roller type thermal fixing device 26 so that the full color image is thermally fixed on the recording sheet. The recording sheet subjected to the thermal fixing passes through guide rollers to be stacked in a stacker 27 provided in the upper portion of the body of the device. A pair of sensors 28-1 and 28-2 is arranged oppositely to the lower plane of the endless belt 12 in the convey belt unit 11 and in the direction perpendicular to the belt moving direction. In FIG. 2, only the front sensor 28-1 is drawn. The sensors 28-1 and 28-2 read toner marks optically to adjust color slippage of the image transferred onto the endless belt 12 and measure the toner density in density adjustment. Color matching processing for adjusting the color slippage and the density is classified into a non-correction mode and an automatic correction mode. The automatic correction mode is divided into a pre-printing correction mode, a periodic correction mode, and a composite mode including both of the pre-printing correction mode and the periodic correction mode. In either of the non-correction mode and the automatic correction mode, manual color matching processing can be manually performed by manual color matching operation. Any one of these modes of color matching processing can be designated through an operation panel set up in the color printer 10, or a microcomputer which is a terminal of a client who requests printing and is connected through a network.

Figure 3A:
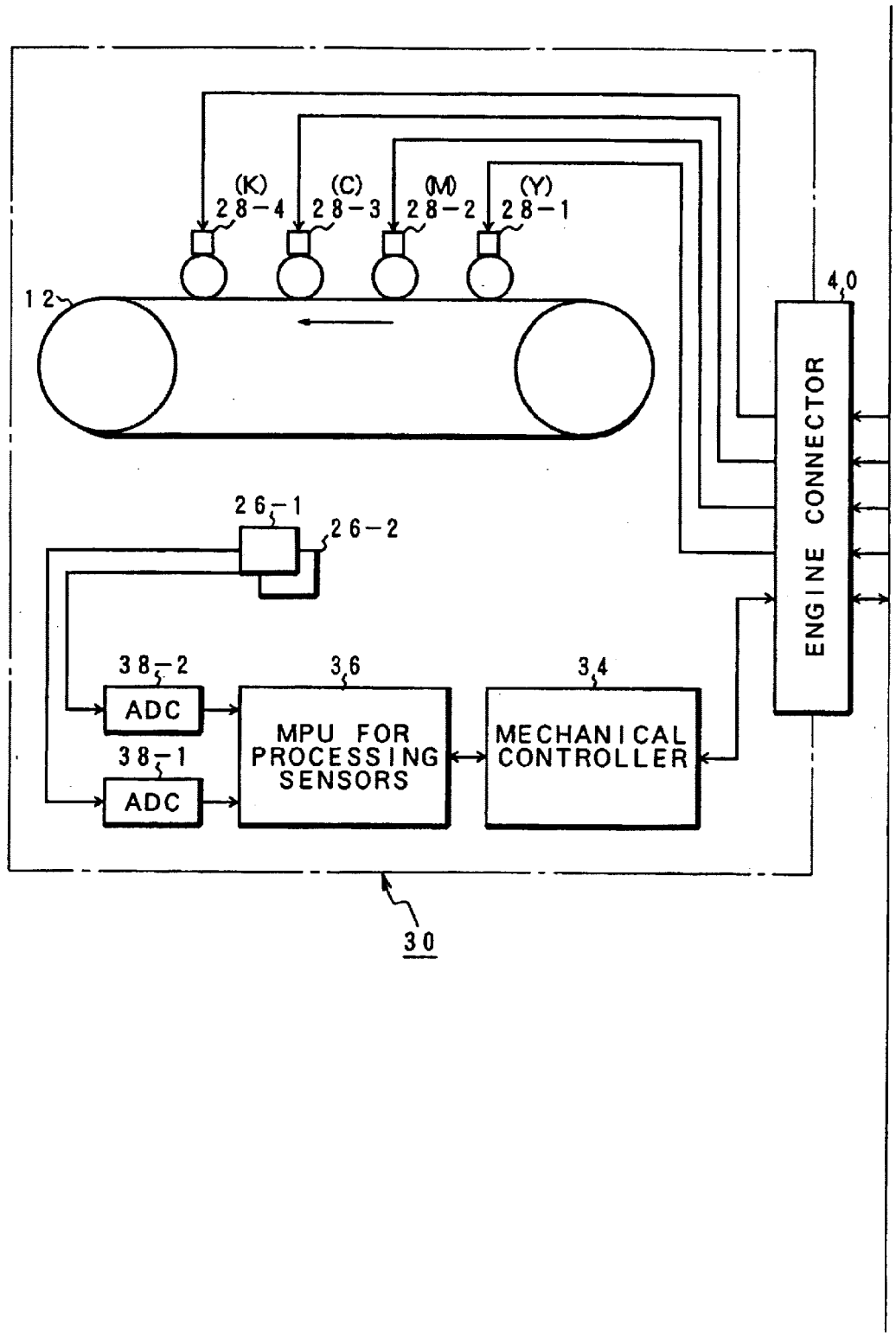
FIG. 3 is a block view of a hardware of the present invention.
Figure 3B:
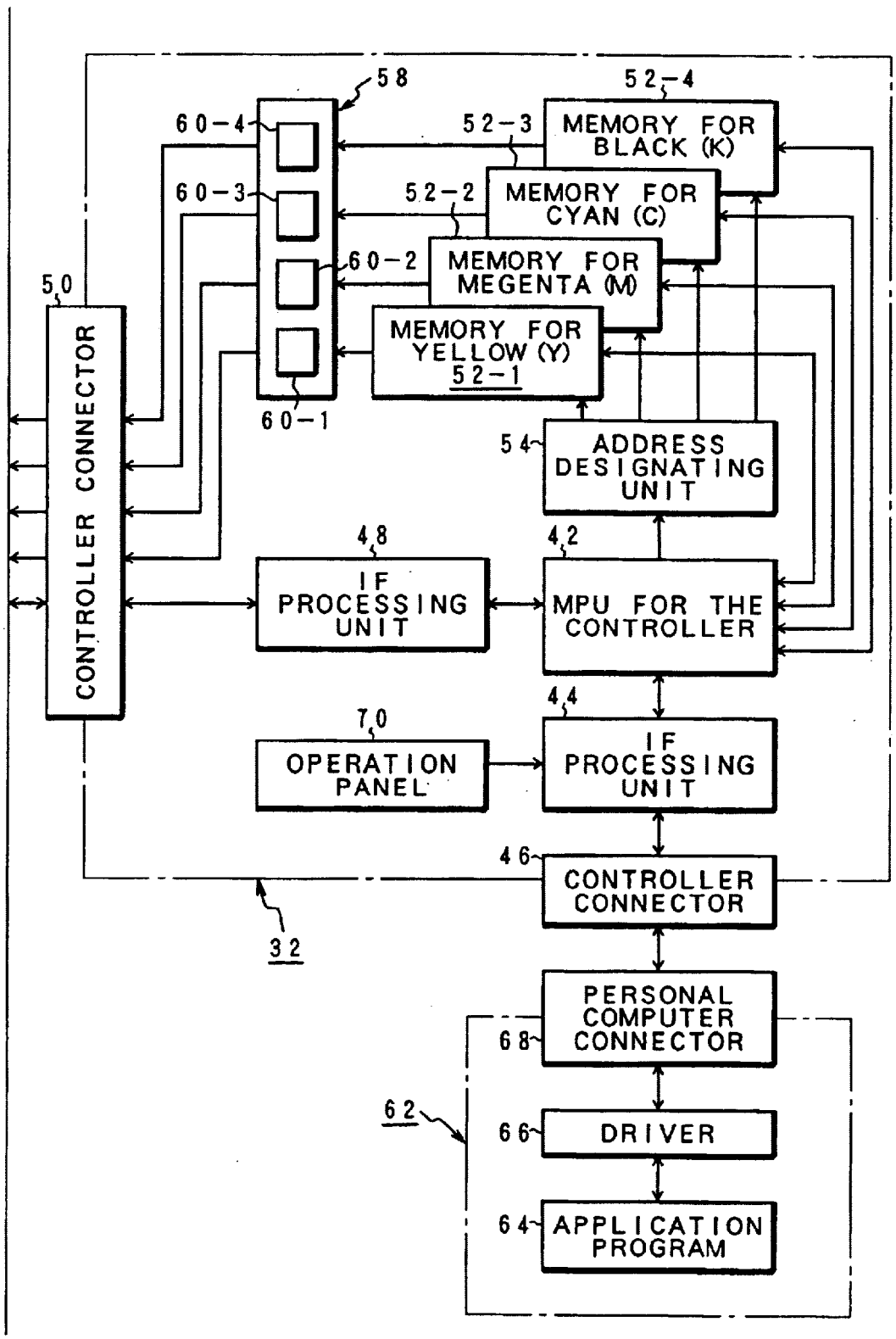

FIGS. 3A and 3B are block views of a hardware of the printing device of the present invention. This hardware is composed of an engine 30 and a controller 32. The engine 30 is provided with a mechanical controller 34 for performing control of the printing mechanism composed of the convey belt unit 11, the electrostatic recording units 24-1 to 24-4 and so on, shown in FIG. 2, and color matching processing according to the present invention. A MPU 36 for processing sensors, which transfers toner marks at the time of color matching processing to measure color slippage quantity and toner density, is connected to the mechanical controller 34. To the sensor processing MPU 36 are inputted detection signals from the pair of the sensors 28-1 and 28-2 set up below the endless belt 12, as digital data sampled by AD converters 38-1 and 38-2. The mechanical controller 34 is connected to the controller 32 side through an engine connector 40. The printing mechanism set up in the engine 30 is illustrated by picking up the endless belt 12 and LED arrays 28-1, 28-2, 28-3, and 28-4 that are fitted to the respective Y, M, C and K electrostatic recording units and function as exposure devices. In the controller 32, a MPU 42 for the controller is set up. To the MPU 42 for the controller, for example, a personal computer 62 as a higher rank device is connected through an interface processing unit 44 and a controller connector 46. The personal computer 62 has a driver 66 for printing color image data supplied from any application program 64. This driver 66 is connected to the controller connector 46 of the controller 32 through a personal computer connector 68. The driver 66 has operation functions that a printing control screen is used to select and designate, to the printer side, one or more of various modes or set values necessary for color printing processing. The MPU 42 in the controller 32 is provided with image memories 52-1, 52-2, 52-3 and 52-4 for developing Y, M, C and K image data transmitted from the personal computer 62 into pixel data (dot data) and storing the pixel data. The MPU 42 for the controller is connected to the engine 30 through the interface processing unit 48 and the controller connector 50, and receives positional slippage data or toner density data detected at the side of the engine 30 to perform, for the pixel data on the respective toners developed in the image memories 52-1 to 52-4, color matching processing including positional slippage correction and toner density correction. The MPU 42 for the controller has an address designating unit 54 for designating addresses when the respective color pixel data are developed in the image memories 52-1 to 52-4. The address designating unit 54 has a function for performing address-conversion for positional slippage correction based on the positional slippage data supplied from the side of the engine 30. The IF processing unit 44 has a frnction as a mode designation processing unit about color matching processing. When the IF processing unit 44 receives an operation request from the driver 66 of the personal computer 62 or an operation request from an operation panel 70 of the printer itself by interruption, the IF processing unit 44 sets up one of the various modes in accordance with the operation request. In accordance with the result of the set mode, the mechanical controller 34 performs color matching processing.

Figure 4B:
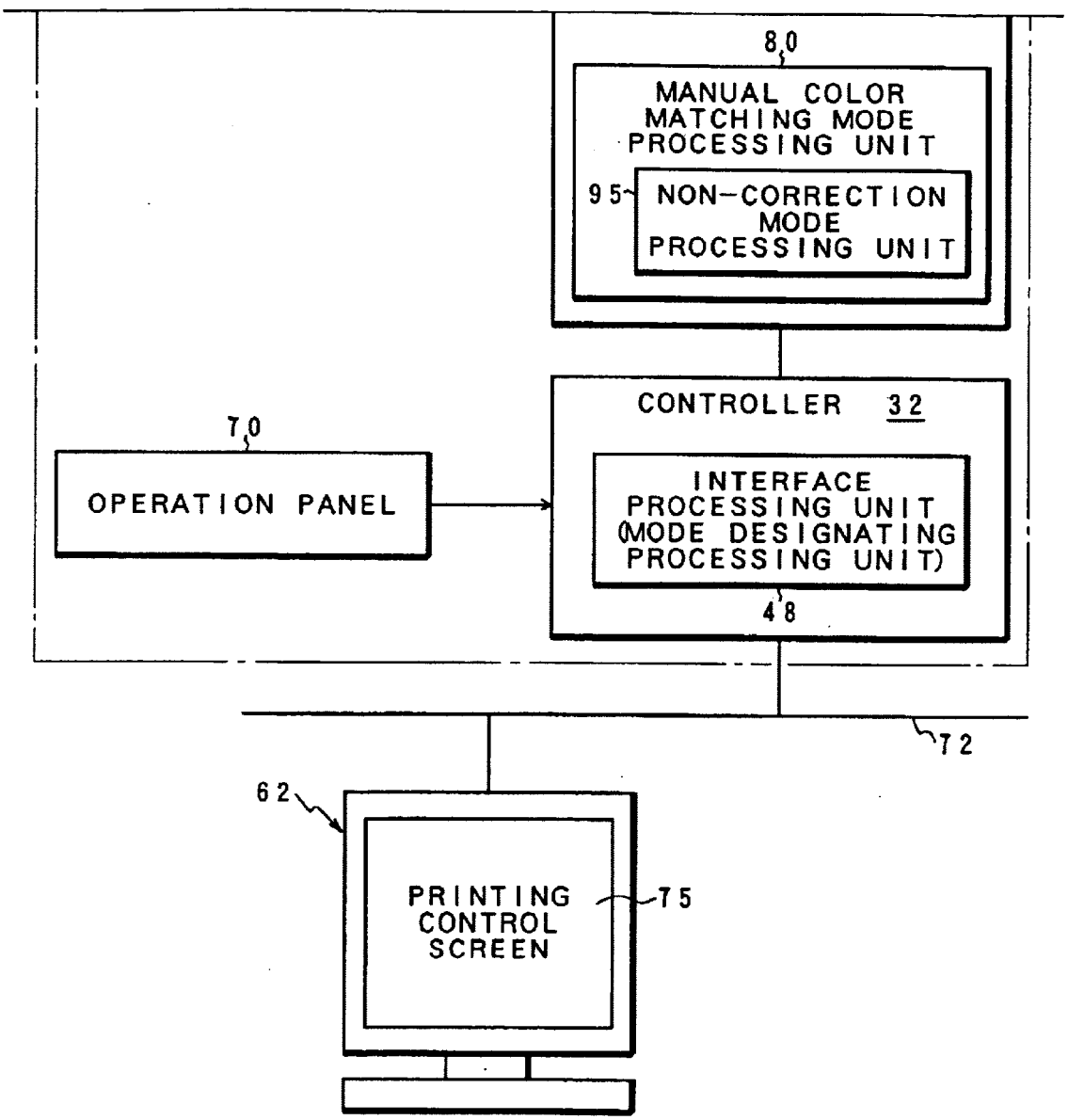

FIGS. 4A and 4B are block views of a structure for performing the color matching processing according to the present invention. The mechanical controller 34 of the color printer 10 has a color matching unit 76, an automatic color matching mode processing unit 78, and a manual color matching mode processing unit 80. The controller 42 has the interface processing unit 48 functioning as a mode designation processing unit. The interface processing unit 48 receives selection of the mode through the operation panel 70 or the printing control screen 74 of the personal computer 62 connected to the terminal, so as to perform mode setup and color matching processing. The color matching unit 76 is composed of a color slippage correction unit 84 and a density correction unit 86. The color slippage correction unit 84 corrects printing position slippage between the respective Y, M, C and K color images based on positional slippage of the LED printer heads in the electrostatic recording unit 24-1 for yellow, the electrostatic recording unit 24-2 for magenta, the electrostatic recording unit 24-3 for cyan, and the electrostatic recording unit 24-4 for black. The density correction unit 86 corrects a color tone based on the difference between the densities of the color images of the respective Y, M, C and K toners. Specifically, in the color slippage correction by the color slippage correction unit 84, toner marks for detecting color slippage are transferred onto the plane of the belt described in Japanese Patent Application Laid-Open No. 11-202737 by the present Applicant, and the toner marks are read by the sensors 26-1 and 26-2 so that the sensor processing MPU 36 detects the color slippage quantities between the respective images. The density correction unit 86 also transfers toner marks of the respective toners on the belt, and the sensor 26-1 side reads the toner marks to obtain the adhesion amount and the density of the respective toners. Density correction is then performed in a manner that designated densities can be obtained. The color slippage correction and the density correction are carried out by adjusting the length and the timing of light emitting time per pixel of the LED heads set up in the Y, M, C and K electrostatic recording units 26-1 to 26-4. The automatic color matching mode processing unit 78 becomes valid when any one of the pre-printing correction mode, the periodic correction mode, and the composite mode including the pre-printing correction mode and the periodic correction mode, each of which is beforehand decided as an automatic mode in the interface processing unit 48, is designated. The unit 78 monitors the realization of conditions matching with the designated mode. Upon the realization of the conditions, the unit 78 controls the color matching processing unit 76 and causes the unit 76 to perform color slippage correction through the color slippage correction unit 84 and density correction through the density correction unit 86. The automatic color matching mode processing unit 78 has a pre-printing correction mode processing unit 88, a periodic correction processing mode 90 and a composite mode processing unit 92, correspondingly to the modes that can be designated. Furthermore, this unit 78 has a standby time timer 94 for monitoring a time interval for color matching in each of the modes. When the pre-printing correction mode processing unit 88 receives a printing request from the personal computer 62, the unit 88 performs color matching correction before printing. However, in the pre-printing correction mode, color matching correction is not necessarily performed when the recording request is received. If elapsed time from the preceding color matching processing or the end of printing is not less than a given time m, which is set up in selection of the mode, color matching processing is performed. In the case that the elapsed time is below the given time m, no color matching process is performed before printing even if the printing request is received. The periodic correction mode processing unit 90 perfonns color matching processing in the case that elapsed time from the preceding color matching processing or the end of printing becomes not less than a given time n in a printing standby state. The composite correction mode processing unit 92 includes the pre-printing correction mode processing unit 88 and the periodic correction mode processing unit 90. If a printing request is received and elapsed time from the preceding color matching processing or the end of printing is not less than the given time m, which is set up in selection of the pre-printing correction mode, color matching processing is performed. In the case that elapsed time from the preceding color matching processing or the end of printing becomes not less than the given time n, which is set up in the periodic correction mode, in a printing standby state, color matching processing is performed. In the processing of each of the pre-printing correction mode processing unit 88, the periodic correction mode processing unit 90 and the composite correction mode processing unit 92, the standby time timer 94 resets timer value Tw at the time of color matching processing or the end of printing processing to count elapsed time. The manual color matching mode processing unit 80 has a non-correction mode processing unit 95. The non-correction mode processing unit 95 becomes valid by designation of a non-correction mode through the printing control screen 75 of the personal computer 62 or the operation panel 70, so that no color matching processing is performed in either pre-printing state or printing standby state. Color matching processing can be performed only in the case that the operation panel 70 or the printing control screen 74 of the personal computer 62 is used to designate execution of manual color matching. In other words, in the non-correction mode, no automatic color matching processing is performed by the non-correction mode processing unit 95 in the printer and color matching processing can be performed only by operator's manual operation. The operation of execution of manual color matching through the operation panel 70 and the printing control screen 75 of the personal computer 62 is valid in the state that any one mode is set by the automatic color matching mode processing unit 78. Regardless of the state of the automatic mode, the automatic color matching mode processing unit 78 causes the color matching processing unit 76 to perform color matching processing forcibly when the interface processing unit 48 recognizes a request of manual color matching execution as an interruption request.

Figure 5A:
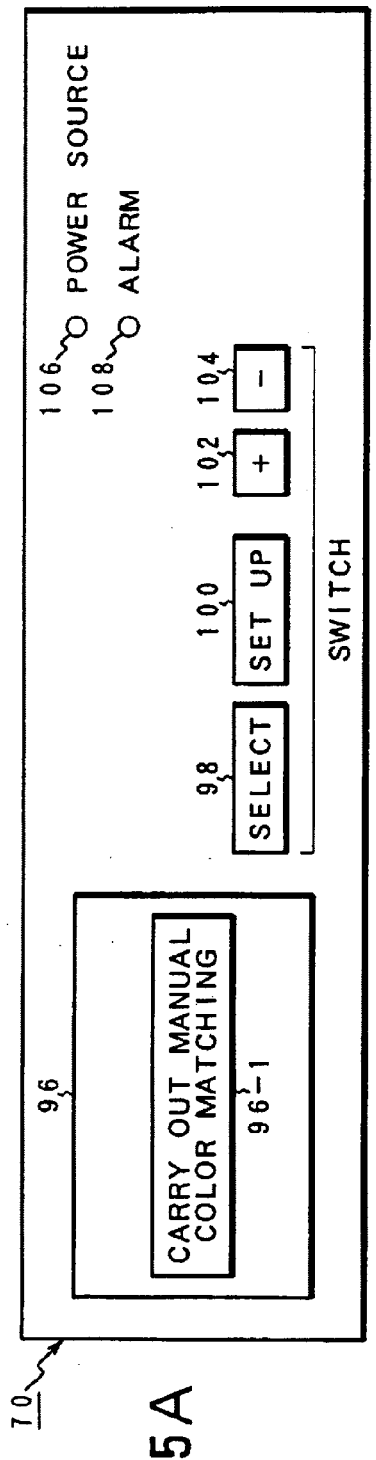
FIGS. 5A and 5B are explanatory diagrams of an operation panel for designating manual color matching operation in a non-correction mode according to the present invention, and a printing control screen.
Figure 5B:
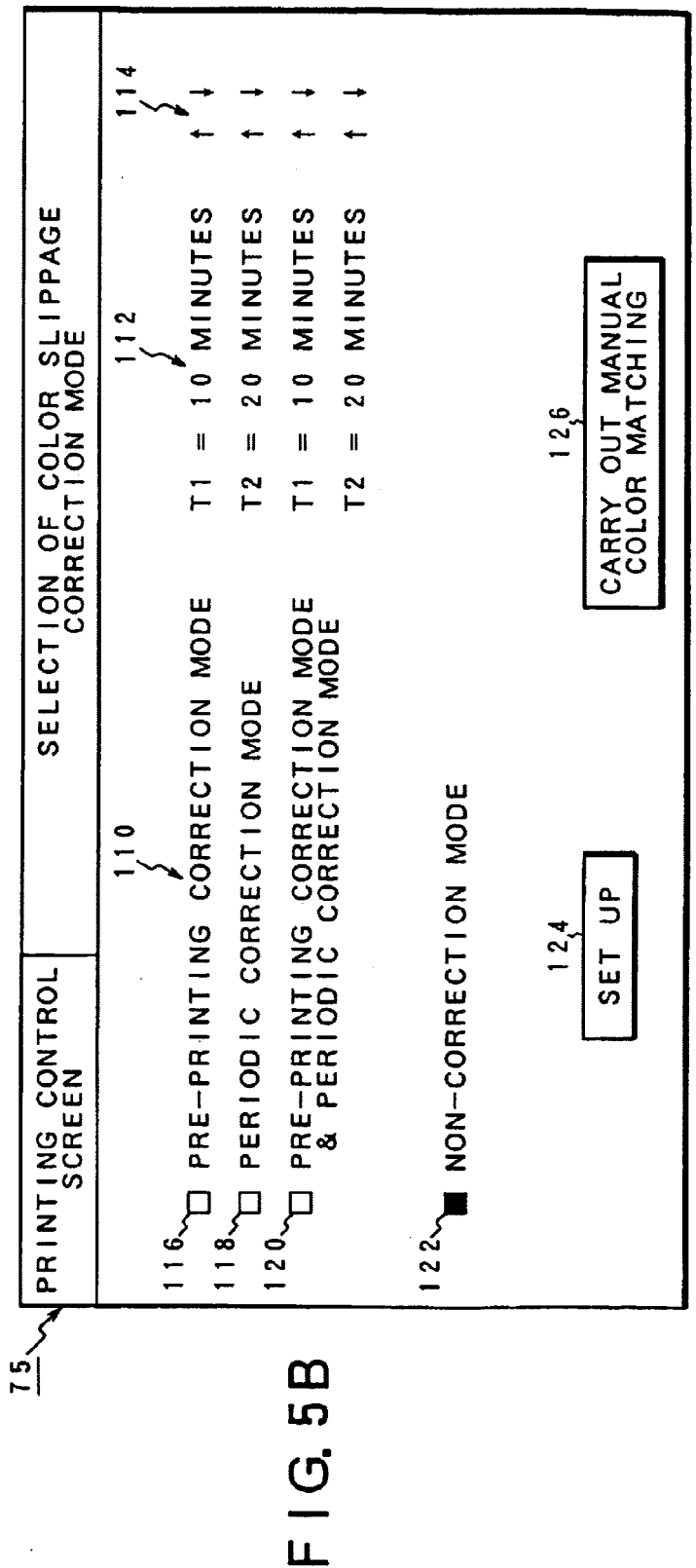

FIGS. 5A and 5B are explanatory diagrams of operation and function of color matching processing through the operation panel 70 and the printing control screen 75 of the personal computer 62. FIG. 5A shows the operation panel 70 of the printer. At the right side of a character display unit 95, a selection switch 98, a setup switch 100 and an up switch 102 and a down switch 104 are arranged. Moreover, a power source pilot lamp 106 and an alarm pilot lamp 108 are arranged. An operation message on the character display unit 95 can be cyclically switched whenever the selection switch 98 is pushed. In FIG. 5A, as an operation message 96-1, the message "CARRY OUT MANUAL COLOR MATCHING" is selected. When the setup switch 100 is operated in the state that the message "CARRY OUT MANUAL COLOR MATCHING" is selected, the printer is changed into the processing state based on the non-correction mode processing unit 95 by a command from the manual color matching mode processing unit 80 shown in FIG. 4A and 4B. The unit 95 causes the color matching processing unit 76 to operate when the interface processing unit 48 recognizes an interruption request of execution of manual color matching from the operation panel 70. FIG. 5B shows the print control screen 75 of the personal computer 62 shown in FIGS. 4A and 4B. The screen shows the content corresponding to manual color matching based on the selection of the message "CARRY OUT MANUAL COLOR MATCHING" shown in FIG. 5A. On this printing control screen 75, an automatic mode selection unit 110, a setup time display unit 112 and a setup time change unit 114 are assigned to select a mode of color matching processing and designate set values. In the automatic mode selection unit 110, the pre-printing correction mode, the periodic correction mode, and the pre-printing correction & periodic correction mode (composite mode) in the automatic correction mode are displayed. For the respective modes, check boxes 116, 118 and 120 are assigned. Moreover, the non-correction mode is displayed, and for this mode a check box 122 is assigned. In the setup time display unit 112, values of setup times T1 and T2 are displayed. The times T1 and T2 are setup times for color matching processing in the pre-printing correction mode, the periodic correction mode, and the pre-printing correction & periodic correction mode, respectively. The values of the displayed setup times T1 and T2 can be increased or decreased, for example, 1 minute by 1 minute, by clicking operation onto upward and downward arrows displayed in the setup time change unit 114 at the right side. That is, when the upward arrow in the setup time change unit 114 is clicked, the number showing time in the setup time display unit 112 at the right side is increased 1 minute by 1 minute. When the downward arrow is clicked, the number is decreased 1 minute by 1 minute. At the lower side of the printing control screen 75, a setup switch 124 and a manual coloring matching execution switch 126 are assigned. Any one of the check boxes 116, 118, 120 and 122 in the automatic mode selection unit 110 on the printing control screen 75 is clicked. If necessary, the time indicated by the corresponding setup time display unit 112 is decided through the setup time change unit 114. Thereafter, a mode setup request including the designated mode and setup time following the mode designation is supplied to the printer side when the setup switch 124 is clicked. When the manual color matching execution switch 126 is clicked, a manual color matching request is supplied to the printer regardless of the set mode. Immediately, color matching processing is performed.

Figure 6A:
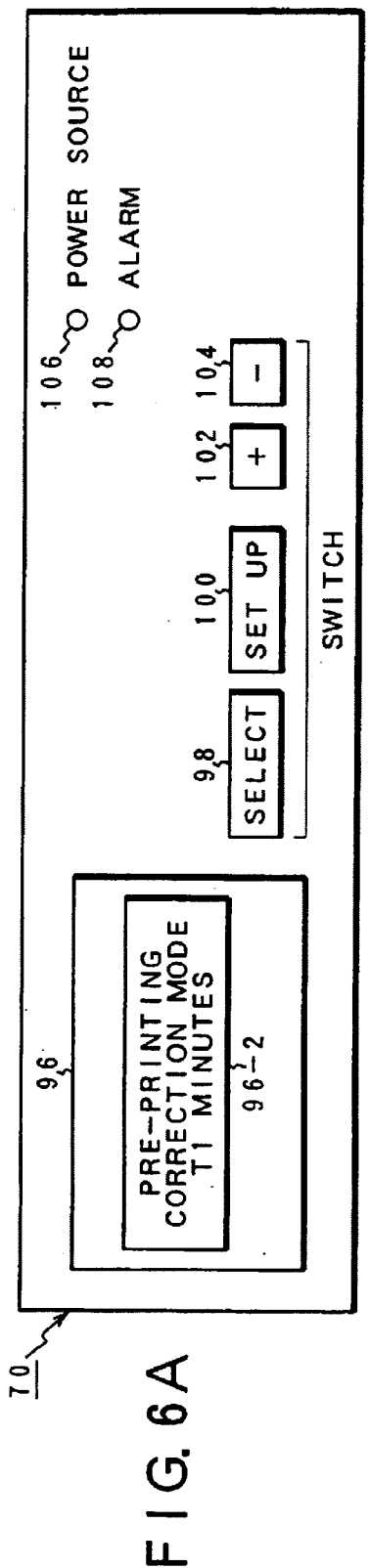
FIGS. 6A and 6B are explanatory diagrams of an operation panel for designating an operation panel for designating a pre-printing correction mode according to the present invention, and a printing control screen.
Figure 6B:
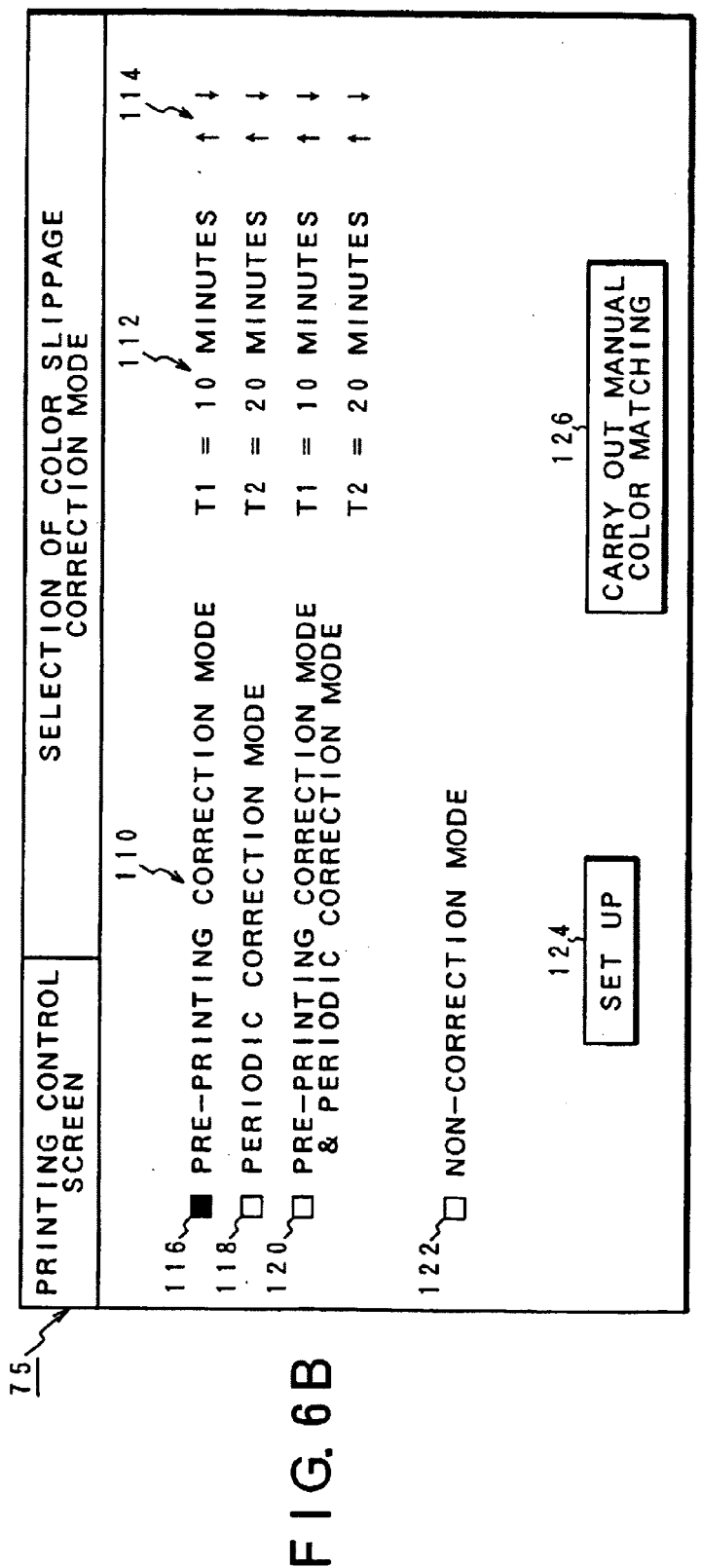

FIGS. 6A and 6B show the operation panel 70 and the printing control screen 75 used when an operator sets up the pre-printing correction mode into the printer. On the operation panel 70 shown in FIG. 6A, by operation onto the selection switch 98, a message 96-2 "PRE-PRINTING CORRRECTION MODE T1 MINUTES" is selected and displayed. If necessary, in this state, the setup time T1 is changed and decided through the up switch 102 or the down switch 104. Thereafter, by pushing the setup switch 100, a request of designation of the pre-printing correction mode is supplied to the printer side. The setup time which should be compared with the standby time timer is set to T1 minutes. FIG. 6B shows the printing control screen 75 for designating the pre-printing correction mode that is the same as in the operation panel 70 shown in FIG. 6A. In this case, by clicking the check box 116 to reverse the display therein, the pre-printing correction mode is selected. When the pre-printing correction mode is selected in this way, the upward and downward arrows in the setup time change unit 114 at the right side are clicked so that, for example, the time "10 minutes" is selected as the time T1 in the setup time display unit 112. The setup switch 124 is then clicked so that a request of the designation of the mode based on the contents set on the screen is supplied to the printer side.

FIGS. 7A and 7B show the operation panel 70 and the printing control screen 75 for designating the periodic correction mode to the printer. On the operation panel 70 shown in FIG. 7A, a message 96-3 "PERIODIC CORRECTION MODE T2 MINUTES" is selected and displayed in the character display unit 95 by operation onto the selection switch 98. If in this case the operator wants to change the setup time T2, the operator operates the up switch 102 or the down switch 104 to set a desired time. If the setup is ended, the setup switch 100 is operated to inform the printer of the designated mode data and the setup time that are set through the operation panel 70. As a result, color matching processing in the periodic correction mode is performed. FIG. 7B is an explanatory diagram of the printing control screen 75 corresponding to the operation panel 70 for designating the periodic correction mode shown in FIG. 7A. In the printing control screen 75, the check box 118 is clicked to reverse the display therein. In this way, the periodic correction mode is selected. If necessary, the upward and downward arrows in the setup time change unit 114 are operated, so that the setup time T2 in the periodic correction mode, which is displayed in the setup time display unit 112, can be decided to, for example, 20 minutes. After the periodic correction mode is selected and the setup time T2 is decided in this way, the setup switch 124 is pushed to supply a mode designation request to the printer side. In this way, the printer is changed into the running state of color matching processing in the periodic correction mode. Moreover, the setup time used for judgment based on the standby time timer in this case is set to T2.

Figure 8A:
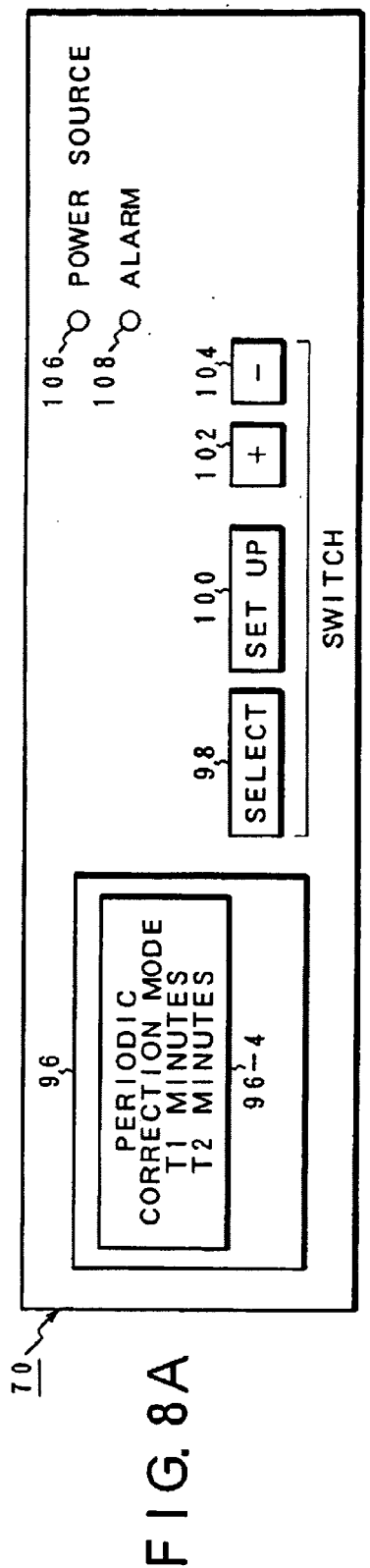
FIGS. 8A and 8B are explanatory diagrams of an operation panel for designating a pre-printing correction & periodic correction mode (composite mode) according to the present invention, and a printing control screen.
Figure 8B:
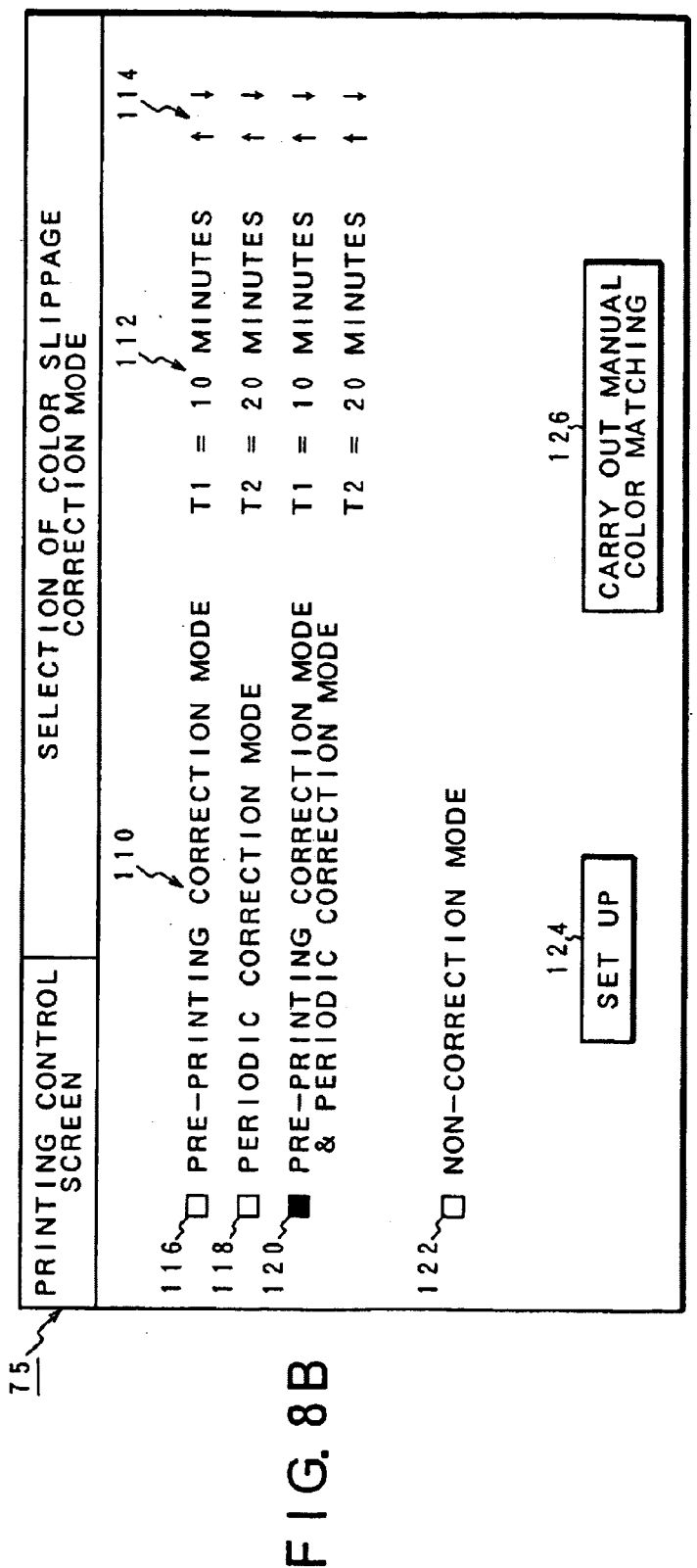

FIGS. 8A and 8B show the operation panel 70 and the printing control screen 75 for designating, to the printer, the composite correction mode including both of the pre-printing correction mode and the periodic correction mode. On the operation panel 70 shown in FIG. 8A, by operation onto the selection switch 98, a message 96-4 "PERIODIC CORRECTION MODE T1 MINUTES AND T2 MINUTES" is displayed. If necessary, the up switch 102 and the down switch 104 are used to change the setup times T1 and T2 in lines 2 and 3 of the message 96-4. After the setup, the setup switch 100 is pushed to give notice of the contents displayed on the operation panel 70, as mode designation data, thereby performing color matching processing in the composite correction mode, that is, the pre-printing correction & periodic correction mode. FIG. 8B is an explanatory diagram of the printing control screen 75 corresponding to the contents set on the operation panel 70 shown in FIG. 8A. In this case, the check box 120 is clicked to reverse the display therein. In this way, the composite correction mode, that is, the pre-printing correction & periodic correction mode (composite correction mode) is selected. In the composite correction mode, wherein the two modes are designated at the same time, times T1 and T2 are displayed in the setup time display unit 112. The setup time change unit 114 is used to set any time desired by the operator, for example, 10 minutes and 20 minutes to the times T1 and T2, respectively. After such selection and setup, the setup switch 124 is clicked to inform the printer of the contents selected on the printing control screen 75 to perform color matching processing in the pre-printing correction & periodic correction mode.

Figure 9A:
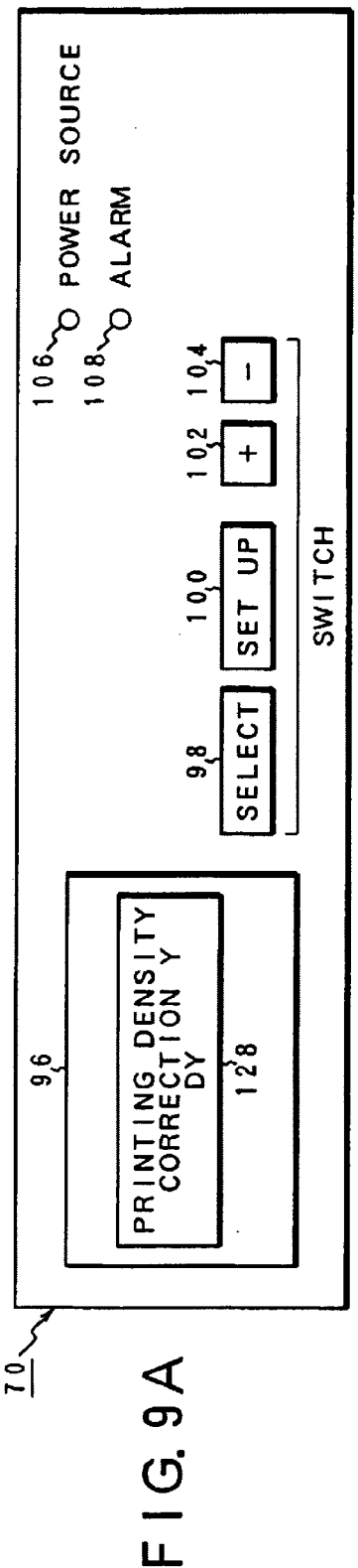
FIGS. 9A and 9B are explanatory diagrams of an operation panel for designating density correction conditions according to the present invention by percentage, and a printing control screen.
Figure 9B:
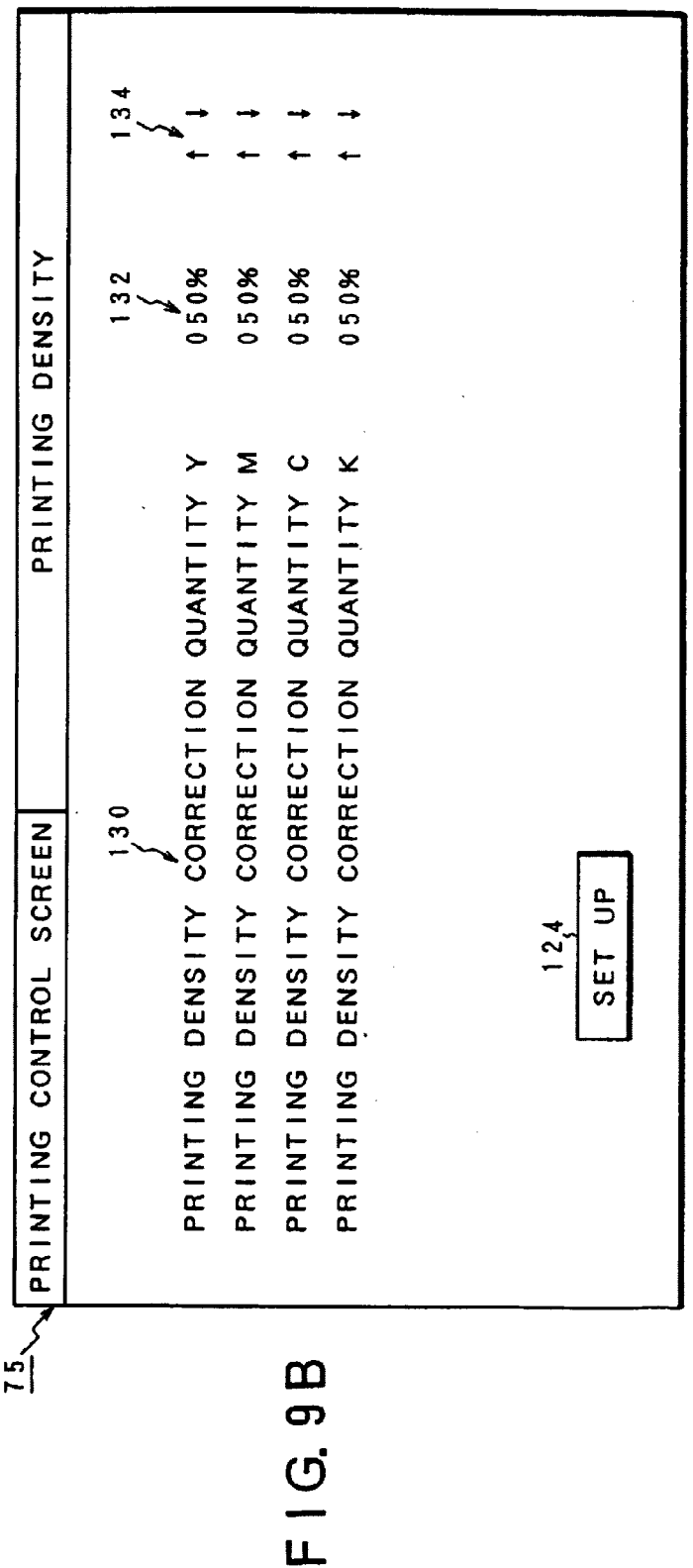

FIGS. 9A and 9B are explanatory diagrams of the operation panel 70 and the printing control panel 75 for density correction of Y, M, C and K, which is included in the color matching processing according to the present invention. To designate density correction onto the operation panel 70 shown in FIG. 9A, a message 128 "PRINTING DENSITY CORRECTION Y DY" is displayed in the character display unit 96. This message 128 indicates that the designated correction is density correction of yellow (Y) and the density correction value (=the density correction quantity) thereof is DY. The density correction value "DY" is a numerical value by percentage. By operating, for example, the up switch 102 or the down switch 104, the density correction value DY can be changed +5% or –5% at a time. When the density correction value DY is decided, the setup switch 100 is operated to inform the density correction unit 86 in the color matching processing unit 76 of the printing density correction value DY of the yellow (Y) toner through the interface processing unit 48 shown in FIGS. 4A and 4B, so as to perform correction for setting the present density value to the designated density correction value DY. Concretely, this density correction is performed by controlling the length of light emitting time per dot of the LED array arranged in the electrostatic recording units. This operation panel 70 displays an example of the selection and designation of the density correction value of the yellow (Y) toner. In the same way as about the magenta (M), cyan (C) and black (K), the selection switch 98 is operated to display any one of density correction values DN, DC and DK as the message 128 in the character display unit 96. If necessary, the up switch 102 or the down switch 104 is operated to adjust the density correction value DM, DC or DK. Thereafter, by pushing the setup switch 100, it is possible to perform color matching processing based on the designation of the density correction value onto the density correction unit 86 set up in the color matching processing unit 84 shown in FIGS. 4A and 4B.

FIG. 9B shows the printing control screen 75 corresponding to the contents of the density correction on the operation panel 70. On this printing control screen 75 for the printing density, a density correction color selection unit 130, a density correction display unit 132 and a density change unit 134 are assigned. The screen displays density values that are target correction values, as the density correction values DY, DM, DC and DK (050%) corresponding to the four Y, M, C and K color toners. Any one of these density correction values can be changed +5% or –5% at a time by operation onto the upward arrow and the downward arrow displayed in the density change unit 134. After the density correction values of the respective color toners can be set up on the printing control screen 75, the setup switch 24 is clicked to set the correction quantity about the pre-printing correction mode on the printing control screen 75 into the density correction unit 86 in the color matching processing unit 76 shown in FIGS. 4A and 4B, so as to adjust the light emitting timing and the light emitting time per dot of the LED heads in the electrostatic recording units 24-1 to 24-4. The adjustment is performed in such a manner that the density correction values set up from the outside will be target values.

Figure 10A:
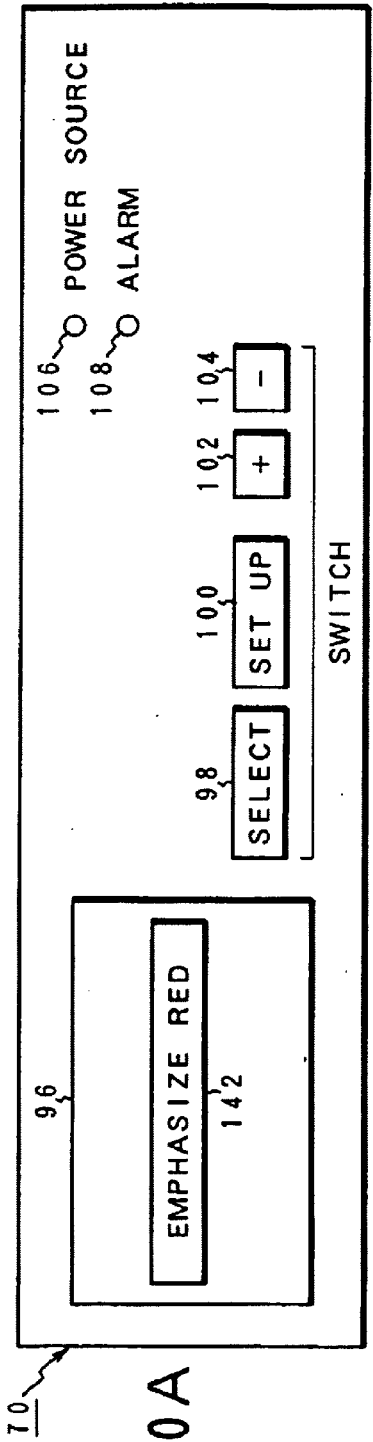
FIGS. 10A and 10B are explanatory diagrams of an operation panel for designating density correction conditions according to the present invention by color tone, and a printing control screen.
Figure 10B:
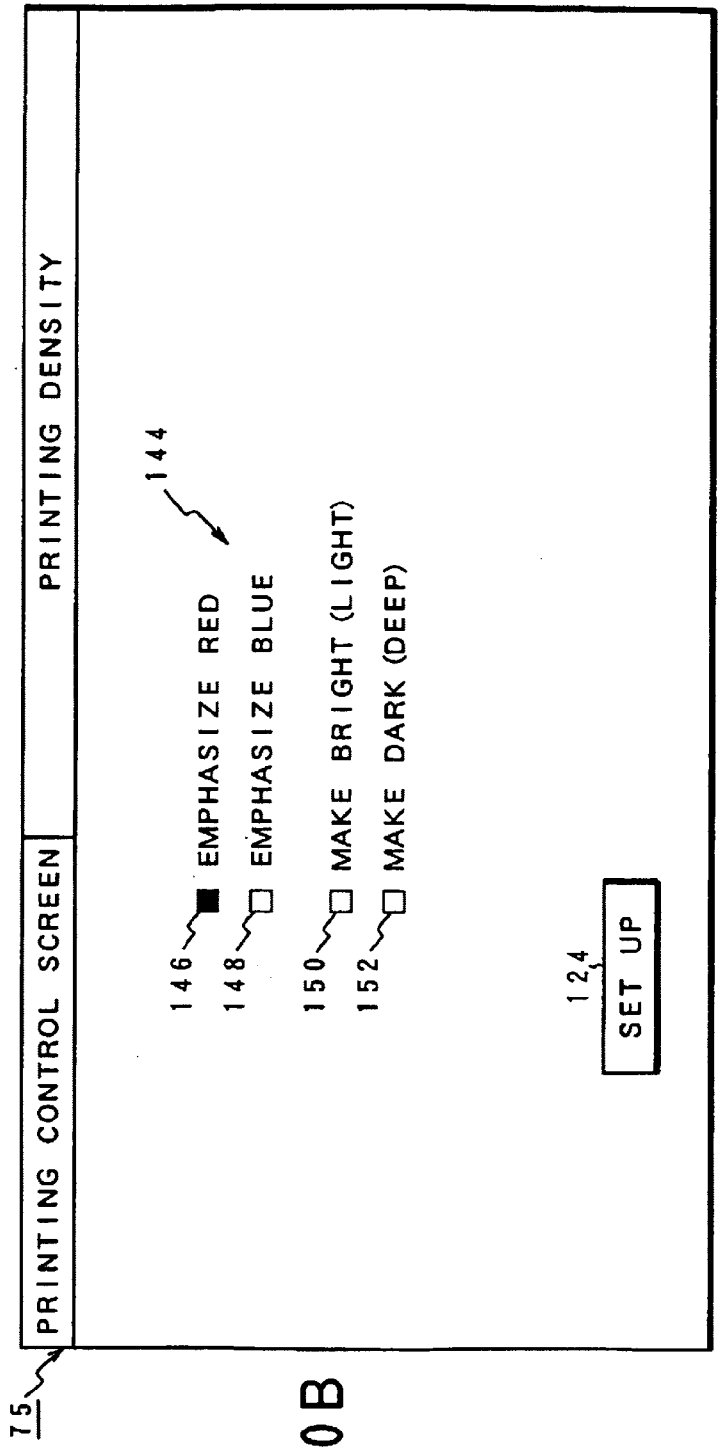

FIGS. 10A and 10B show another embodiment of density designation of color images in the present invention. The embodiment shown in FIG. 9 is characterized in that the density correction values of the respective color toners are designated by percentage. In the present embodiment, the density correction values are not directly designated but color toners are designated. FIG. 10A shows indirect designation of density correction through the operation panel 70. By operating the selection switch 98 for the character display unit 96, for example, correction indicated by "EMPHASIZE RED", that is, correction that no density correction values are directly designated, is selected as the message 142 for density correction. As such indirect selection of the density correction values, "EMPHASIZE BLUE" may be selected oppositely to "EMPHASIZE RED". Besides these, "MAKE BRIGHT (LIGHT)" or "MAKE DARK (DEEP)" can also be selected. FIG. 10B shows the printing control screen 75 for designating indirectly the same density correction values as in the operation panel 70 shown in FIG. 10A. On the printing control screen 75, a pair of check boxes 146 and 148 for "EMPHASIZE RED" and "EMPHASIZE BLUE", respectively, is assigned in a density correction color selection unit 144. A pair of check boxes 150 and 152 for "MAKE BRIGHT (LIGHT)" and "MAKE DARK (DEEP)", respectively, is also displayed. In this example, by clicking the check box 146 to reverse the display therein, indirect density correction "EMPHASIZE RED" is selected. By pushing the setup switch 124, the density correction values of Y, M, C and K, correspondingly to the selected indirect density correction, are set up for density correction of color matching processing. For the message "EMPHASIZE RED" in the check box 146, for example, the following density correction values are prepared: the yellow density correction value DY, the magenta density correction value DM, the cyan density correction value DC and the black density correction value DK are set up to +20%, +20%, −20% and 0%, respectively, to default density values, which are standard density values. These values are designated as density correction values by clicking and selecting the check box 146 indicating the message "EMPHASIZE RED". For the message "EMPHASIZE BLUE" in the check box 148, for example, the following density correction values are prepared: the yellow density correction value DY, the magenta density correction value DM, the cyan density correction value DC and the black density correction value DK are set up to −20%, −20%, +20% and 0%, respectively, to default density values. These values are designated as density correction values by clicking the check box 148 indicating the message "EMPHASIZE BLUE" and selecting the densities indirectly. For the message "MAKE BRIGHT (LIGHT)" in the check box 150, for example, the following density correction values are prepared: the yellow density correction value DY, the magenta density correction value DM, the cyan density correction value DC and the black density correction value DK are set up to −20%, −20%, −20% and −20%, respectively, to default density values. These values are used as density correction values. For the message "MAKE DARK (DEEP)" in the check box 152, for example, the following density correction values are prepared: the yellow density correction value DY, the magenta density correction value DM, the cyan density correction value DC and the black density correction value DK are set up to +20%, +20%, +20% and +20%, respectively, to default density values.

Figure 11A:
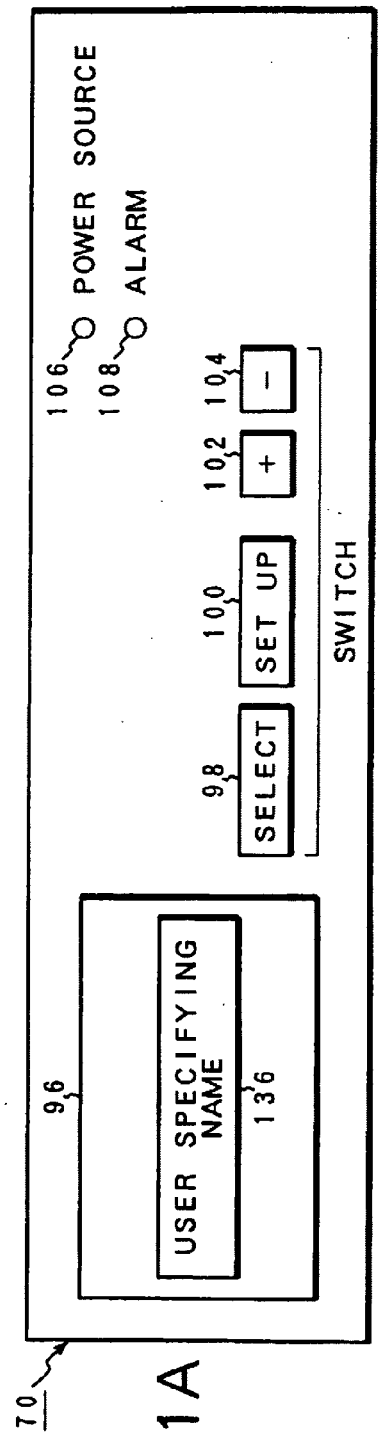
FIGS. 11A and 11B are explanatory diagrams of an operation panel for designating density correction conditions according to the present invention specified by user's name, and a printing control screen.
Figure 11B:
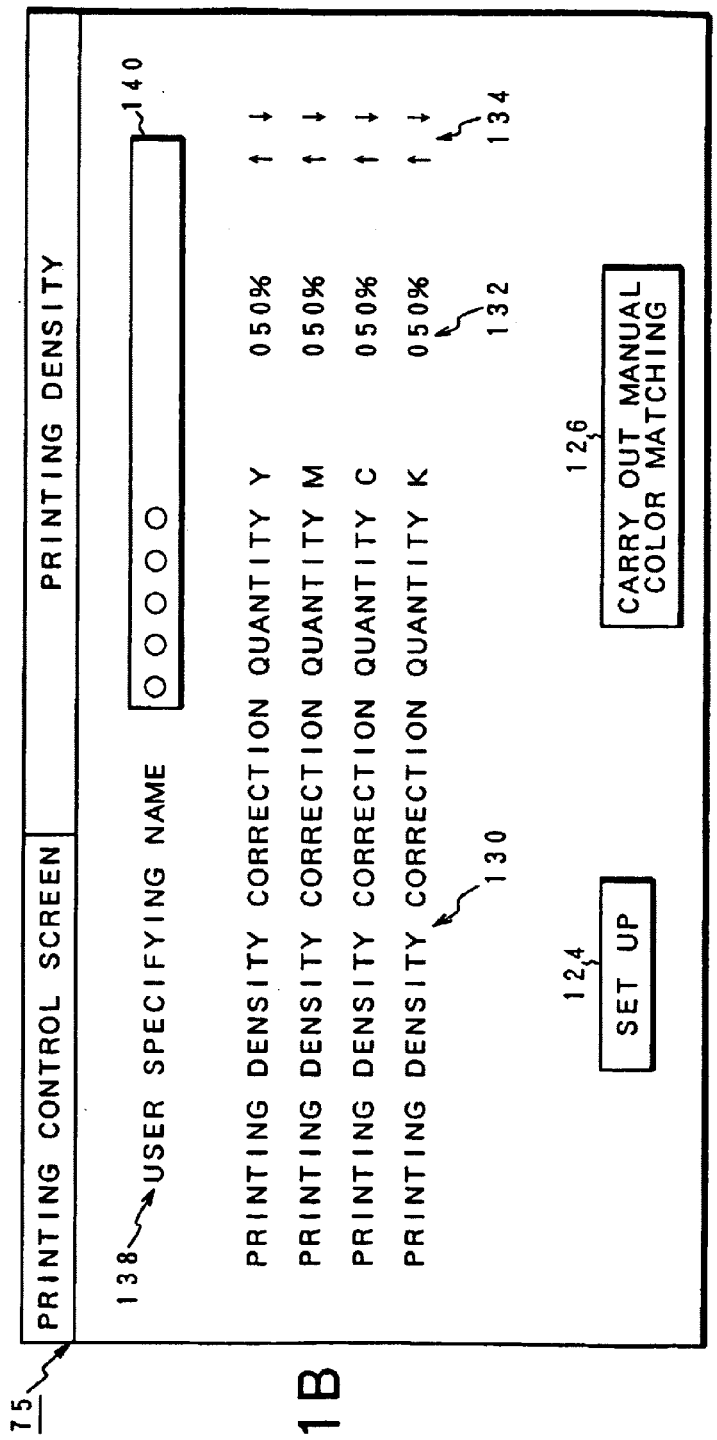

FIGS. 11A and 11B show a further embodiment of density designation in the present invention. The present embodiment is characterized in that a specified density correction value is beforehand registered for each user and this density correction value can be used by user's designation. FIG. 11A shows user's designation of the density correction value through the operation panel 70. As shown in FIG. 9A, the density correction values DY, DM, DC and DK of Y, M, C and K are selected. Thereafter, the character display unit is changed into the display of a message 136. Therein, a user specifying name is inputted and set. By setting this user specifying name, the density correction values DY, DM, DC and DK of Y, M, C and K set up in connection with the user specifying name are registered in the memory. Next, the user can perform density correction using the density correction values DY, DM, DC and DK that are beforehand registered in the printer, without setup of new density correction values of Y, M, C and K, only by selecting and setting the user specifying name shown in FIG. 11A. FIG. 11B shows the printing control screen 75 corresponding to FIG. 11A. In the screen 75, the screen for setting the density correction values of Y, M, C and K and an input frame 140 for inputting the user specifying name are assigned. User's name and so on are inputted therein, and the setup switch 124 is then clicked to register, in connection with the user specifying name, the respective density correction values set up on the screen in the memory of the printer. Thereafter, by inputting the user specifying name 138 in the input frame 140 on the printing control screen 75 and clicking the setup switch 124, density correction that the user desires can be performed without the necessity of setup of new density correction values.

Figure 12B:
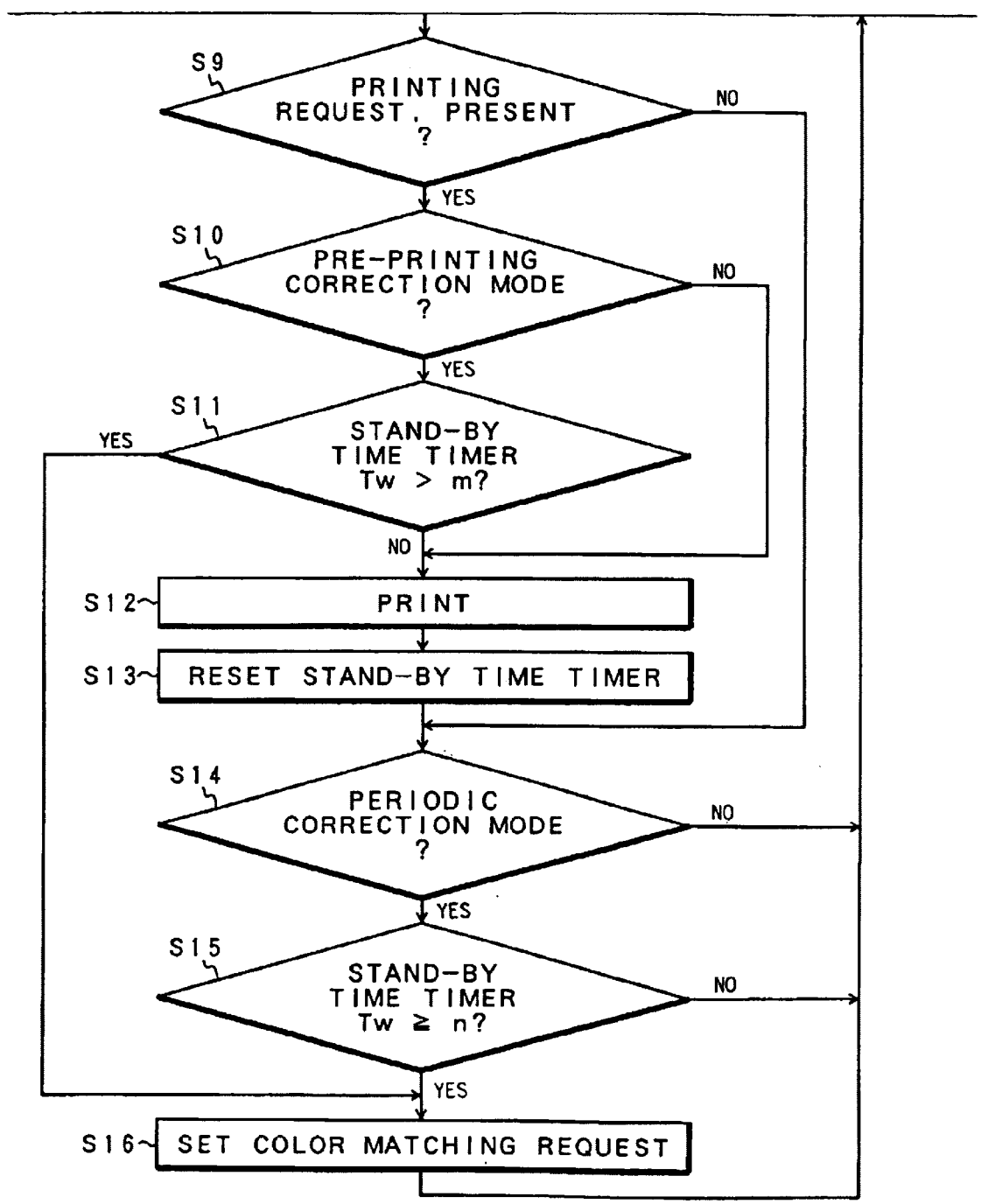
Figure 13B:
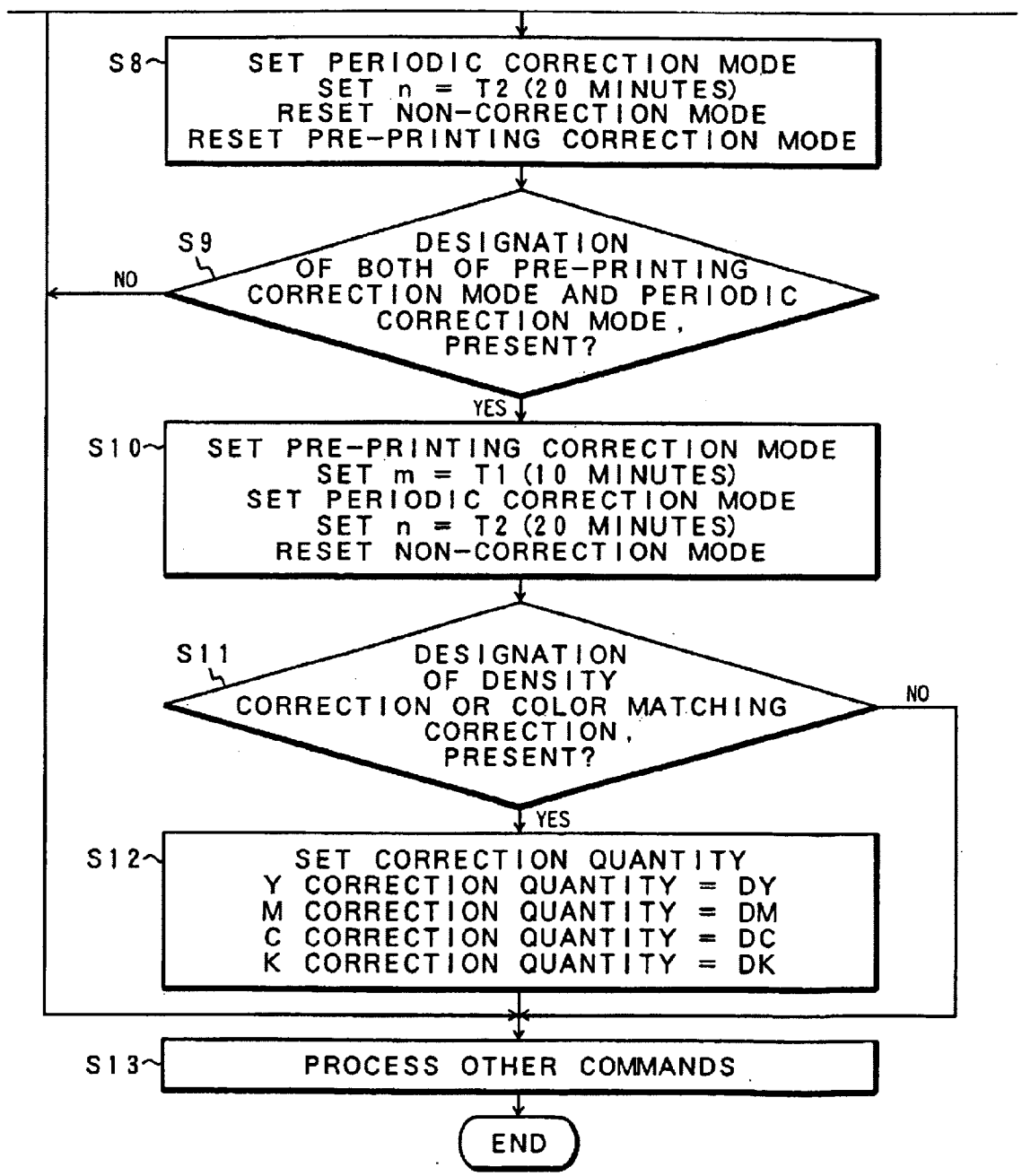
FIG. 13 is a flowchart of interface processing according to the present invention wherein a mode is selected by operator's designation.

FIGS. 12A and 12B are flowcharts of the color matching processing according to the present invention based on the functional block shown in FIG. 4A and 4B. FIG. 13 is a flowchart of interface processing for selecting any one of the modes in the color matching processing according to the present invention. When the power source of the color printer is turned on, in step S1 initial setup is performed. This setup includes initial setup of the hardware, reading of various set values stored in the nonvolatile memory and check of abnormality of the circuit. In the color matching processing in the present invention, for example, the pre-printing mode is setup as default. Thereafter,the mode set up at the time of turning off the power source previously is memorized in the nonvolatile memory, and the preceding mode is designated at the time of turning on the power source newly. Subsequently, in step S2 a color matching request is set. When the cover of the printer is closed for restoration after the cover is opened for exchange of the toner, there is a possibility that the positional slippage of the LED heads is caused. Thus, color matching processing is necessary. In this case, therefore, a color matching request is also set in step S2. Next, in step S3 initial processing of the mechanism in the printer is performed. This initial processing causes initial operations of the respective mechanism parts, the fixing unit, the processing units and so on to make printing possible. After the initial processing in step S3 is normally finished, the present algorithm is changed into the state that printing can be performed. The algorithm goes to a printing wait loop, the start of which is from step S4.

The processing in and after step S4 is classified into the following three modes, and each of them will be described:
(I) the pre-printing correction mode,
(II) the periodic correction mode,
(III) the pre-printing correction & periodic correction mode (composite correction mode).

Assume that through the initial setup processing step S1 following the turning-on of the power source, the present algorithm is in the state that the "pre-printing correction mode" is set up according to the default mode or the mode at the time of turning off the power source previously. In step S4, it is checked whether there is a manual color matching request. If there is no manual color matching request at this time, the algorithm advances to step S5 to check whether there is a color matching request. In the processing based on the turning-on of the power source, a color matching request is set in step S2; therefore, the algorithm advances to step S6 to check whether the set mode is the non-correction mode. Since the present algorism is in the pre-printing correction mode, it goes to step S7 to perform color matching processing. This processing is correction processing of transferring toner marks of Y, M, C and K onto the belt to detect color slippage between the respective colors and adjusting the light emitting timing and the light emitting time per dot of the LED heads to remove the color slippage, and further of adjusting the light emitting time per dot of the LED heads to attain the density correction values DY, DM, DC and DK designated at this time. After the color matching processing in step S7, the timer value Tw of the standby time timer 94 is reset to zero in step S8, so that the present algorithm is again started. If a manual color matching request is set, this request is reset. Moreover, the color matching request set in step S2 is reset since the color matching processing is ended in step S7. Subsequently, it is checked in step S9 whether there is a printing request from the microcomputer 62. If there is no printing request, the present algorithm returns to step S4 through step S14, to repeat the printing wait loop of steps S4–S9 and S16. If a printing request is received in this state, the algorithm advances to steps S9–S10. Since the algorithm is in the pre-printing correction mode at this time, in step S11 it is checked whether the timer value Tw of the standby time timer 94 is not less than the setup time m set by designation in the pre-printing correction mode. As this setup time m, for example, time T1 is set. The time T1 is set, for example, within the range of 1 to 30 minutes. For example, T1=10 (minutes) is set. This becomes the setup time m. It is checked whether the timer value Tw of the standby time timer 94 is not less than 10 minutes. If the timer value Tw is over 10 minutes, it is judged that color matching is necessary. As a result, the algorithm advances from step S11 to step S16 to set a color matching request. The algorithm then advances to color matching step S7 through steps S4, S5 and S6, to receive a printing request, thereby performing color matching processing before printing. In step S8, the algorithm starts by resetting the standby time timer 94 in step S8, and then resets the color matching request. Since the printing request is present in step S9, the algorithm advances to step S10. Since the algorithm is in the pre-printing correction mode, the algorithm goes to step S11. Since the standby time timer 94 starts again by being reset in step S8 after the color matching processing, the setup time m is below 10 minutes. Therefore, the algorithm performs printing processing in step S12. After the printing processing in step S12, the algorithm starts again by resetting the standby time timer 94 in step S13, and returns to the printing wait loop in the pre-printing correction mode. In the case that the algorithm judges that a printing request is present and the timer value Tw is below the setup time m=10 minutes in step S11 through step S10, printing processing is immediately performed in step S12.

The following will describe processing operation in the state that the periodic correction mode is selected. When the periodic correction mode is set by initial setup processing in step S1 following the turning-on of the power source, the algorithm goes to the printing wait loop from step S4. In response to the setting of a color matching request in step S2 following the turning-on of the power source, the algorithm performs color matching processing in step S7, and then starts by resetting the standby time timer 94 in step S8. Thereafter, if a manual color matching request is present, this request is reset. The color matching request in step S2 is also reset since the color matching processing in step S7 is ended. Subsequently, the algorithm goes into the state of printing wait in step S9, wherein it is checked whether a printing request is present. In the printing wait state that no printing request is present, the algorithm advances to step S14 to check whether the present mode is the periodic correction mode. Since the present mode is the periodic correction mode at this time, the algorithm advances to step S15 to compare the timer value Tw of the standby time timer 94 with the setup time n set at the time of designating the periodic correction mode, for example, T2=20 minutes. If the timer value Tw is not less than n=20 minutes, a color matching request is set in step S16. By setting the color matching request in step S16, the algorithm goes to step S5 to judge that the color matching request is present. As a result, the algorithm advances to steps S6–S7 to perform color matching processing. After the color matching processing, the algorithm resets the standby time timer 94 in step S8 and the color matching request to goes to the printing wait loop, the start of which is from step S9. In this periodic correction mode, therefore, color matching processing is repeated each setup time n in the state of printing wait. On the other hand, when the algorithm judges that a printing request is present in step S9, the algorithm goes to step S10 to check whether the present mode is the pre-printing correction mode. Since the present mode is the periodic correction mode at this time, the algorithm goes to step S12 to perform printing processing immediately. After the printing processing, the algorithm starts by resetting the standby time timer 94 in step S13, and then returns again to the printing wait loop through steps S14 and 15.

The following will describe the composite correction mode including both of the pre-printing correction mode and the periodic correction mode. The composite correction mode is a mode of combination of the pre-printing correction mode and the periodic correction mode. If the count time of the standby time timer 94 is not less than the given time m=T1 (10 minutes), which is a time designated in the pre-printing correction mode, when a printing request is received, color matching processing is performed and subsequently printing is carried out. When the timer value Tw of the standby time timer 94 becomes not less than the given time n=T2 (10 minutes), which is set when the periodic correction mode is designated, a color matching request is set to perform color matching processing. In the composite correction mode of the pre-printing correction mode and the periodic correction mode, it is necessary to set the given time m in the pre-printing correction mode to a time shorter than the given time n in the periodic correction mode. Namely, the relationship m and n should be m≦n. If the given time m in the pre-printing correction mode is set to a time shorter than the given time n in the periodic correction mode in this way, color matching processing can be performed before printing in the state that a printing request is received with the passage of the count time of the standby time timer 94. In the state of printing wait, color matching processing can be performed with the passage of the given time n in the periodic correction mode. Contrarily, if the given time m in the pre-printing correction mode is set to a time longer than the given time n in the periodic correction mode (m>n), color matching processing is performed only at the intervals of the given time n in the periodic correction mode. Color matching processing is not performed with the passage of the given time m in the pre-printing correction. Therefore, the relationship m≦n about the set times should be kept in the composite mode.

Besides the pre-printing correction mode, the periodic correction mode, and the composite correction mode in the automatic correction mode, the non-correction mode can be designated in the present invention. Assume that the same non-correction mode as at the time of the preceding turning-off of the power source is set by initial setup processing in step S1 following turning-on of the power source. In this case, after the setup of a color matching request in step S2 and initial processing in step S3, the algorithm goes into the printing wait loop from the step S4. In step S5, it is judged that the color matching request is present, following the turning-on of the power source, so that the algorithm goes to step S6. Since the present mode is the non-correction mode at this time, the algorithm skips the color matching processing in step S7 and starts by resetting the standby time timer 94 in step S8. If there is a manual color matching request, this request is reset. Furthermore, the color matching request set in step S2 is reset. In this state, in step 9 the algorithm judges that a printing request is present to advance to steps S10–S12 to perform printing processing. After the printing process, the algorithm starts by resetting the standby time timer 94 in step S13 to return again to the printing wait loop from step S4 through step S14. This color matching in the non-correction mode is performed only when the operator requests manual color matching. Namely, when the algorithm judges that a manual color matching request is present in step S4, the algorithm advances immediately to step S7 so as to perform color matching processing instantly. Even if the present mode is either one of the pre-printing correction mode, the periodic correction mode, and the composite correction mode of the two in the automatic correction mode as described above, in step S7 color matching processing is forcibly and instantly carried out when the algorithm judges that operator's manual color matching request is present in step S4.

FIG. 13 is a flowchart of mode selection and density correction value setup processing for color matching processing by designation operation through the operation panel or the personal computer. The processing is performed in the case that a designation interruption from the operation panel 70 is supplied to the interface processing unit 48 of the controller 32 in FIGS. 4A and 4B, or a designation interruption through operation onto the printing control screen 75 of the personal computer 62 is supplied to the unit 48. This interface processing is started in the case of receipt of a command interruption from the operation panel 70 or the personal computer 62. In step S1, it is first checked whether manual color matching is designated. If manual color matching is designated, a manual color matching request is set in step S2. When this manual color matching is set, color matching processing is performed in step S7 immediately after it is judged in step S4 shown in FIG. 12A that this request is set. Subsequently, it is checked in step S3 whether there is designation of the non-correction mode. If there is designation of the non-correction mode, the non-correction mode is set in step S4. When the non-correction mode is set, it is judged in step S6 that the non-correction mode is set in the processing shown in FIGS. 12A and 12B. In this case, the algorithm skips color matching processing in step S7 even if a color matching request is present. Subsequently, it is checked in step S5 whether there is designation of the pre-printing correction mode. If there is designation of the pre-printing correction mode, the pre-printing correction mode is set in step S6 and the setup time T1 is set into the given time m used in the pre-printing correction mode. This setup time T1 can be changed, for example, in the range of 1 to 30 minutes. In this example, T1=10 (minutes) is set. The non-correction mode and the periodic correction mode are also reset. Subsequently, it is checked in step S7 whether there is designation of the periodic correction mode. If there is designation of the periodic correction mode, the periodic correction mode is set in step S8 and the setup time T2 is set into the given time n used in the periodic correction mode. This setup time T2 can be changed, for example, in the range of 10 to 60 minutes. In this example, T2=20 (minutes) is set. The non-correction mode and the pre-printing correction mode besides it are reset. When it is judged in step S9 that the pre-printing correction mode and the periodic correction mode are designated, that is, the composite correction mode is designated, the algorithm goes to step S10 to set the pre-printing correction mode and set the setup time T1, for example, 10 minutes as the given time m in the pre-printing correction mode. At the same time, the algorithm sets the periodic correction mode, sets the setup time T2 as the given time n in the periodic correction mode, and resets the non-correction mode. About the given time in the pre-printing correction mode and the given time n in the periodic correction mode, the requirement for setting the setup times T1 and T2 (that is, $m \leq n$) is decided in order that the composite mode is made valid. Any case in which this requirement is not satisfied is made erroneous. Subsequently, it is checked in step S11 whether density correction or color tone correction is designated. The density correction is correction that the density correction values of DY, DM, DC and DK of Y, M, C and K are directly designated while the color tone correction is correction that color tones are indirectly designated to designate the density correction values of DY, DM, DC and DK. When it is judged in step S11 that the density correction or the color matching correction is designated, the designated correction values of DY, DM, DC and DK are set in step S12. In step S13, processing corresponding to a different command interrupt is performed. As the mode of color matching processing by such interface processing, default or the mode at the time of the preceding turning-off of the power source is selected when the printer shown in FIG. 12 is turned on. During the work of the printer, the operator designates, at will, any one of the non-correction mode, and the pre-printing correction mode, the periodic correction mode and the composite correction mode in the automatic correction mode through the operation panel 70 or the personal computer 62, as the case may be. When in either of the non-correction mode or the automatic correction mode the operator needs instant color matching processing to improve printing precision, the operator requests manual color matching so that color matching processing can be interruptedly performed by the printer. In the pre-printing correction mode and the periodic correction mode, the timer value Tw that is counted by the standby time timer 94 is compared with the given times m and n. When the Tw becomes not less than the given times m and n, color matching processing is performed. Therefore, the given times m and n should be changed dependently on the precision that the operator requests. Against a change in the internal temperature of the printer, the given times m and n are set to smaller values in the case that large effect of the change in the temperature is produced. In this way, it is possible to cope with color slippage and density change based on the change in the temperature appropriately. The given times m and n are set to longer values in the case that the temperature is relatively stable. In this case, unnecessary color matching processing is not performed so that the throughput of printing can be made high.

In the case that mono color printing is mainly performed or printing in which no notice is taken of color slippage, for example, for check of layout, is performed, no color matching processing is performed by selecting the non-correction mode even if the power source is turned on. Thus, it is possible to obtain a first printed matter for a short time. In the case that high-precision printing is required in the non-correction mode, instant color matching processing can be performed by requesting manual color matching. In this case, high-precision printed matter can be obtained.

Moreover, the color correction in the color printer of the present invention can be set up from a microcomputer as a host computer, a personal computer connected to a network, a print server, or the like. Therefore, plural users can print with desired color slippage correction, printing density and color matching regardless of setups of other users.

As described above, according to the present invention, in the case that mono color printing is mainly performed or an image having patterns in which no notice is taken of color slippage, for example, for check of layout, is printed, no color matching processing is performed by setting the non-correction mode even if the power source is turned on. Thus, it is possible to obtain a first printed matter promptly and make printing wait time short. In the non-correction mode, instant color matching can be performed at arbitrary timing by manual color matching operation. Thus, an operator can obtain a printed matter on which, at the case may be, color slippage is corrected at high precision while the operator watches the printed matter. In the automatic correction mode, the time interval of color matching processing, as a condition of automatic correction, can be changed. Effect of the change in the temperature is not easily produced, for example, by setting the time interval to a small value, to make it possible to attain high-precision color slippage and density correction. If the time interval of color matching processing is set to a large value, the throughput of printing is improved. Moreover, it is possible to reduce the number of times of transfer of the toner marks for measuring the color slippage and density of an image in color matching processing, onto the belt, thereby reducing the amount of used toners.

The above-mentioned embodiments are concerned with examples of the printing device using Y, M, C and K color toners. However, the present invention can be applied to any device in which plural color toners can be transferred on a sheet, using electrostatic recording units. The present invention is not limited to the above-mentioned embodiments, and can be appropriately modified within the scope defined in the claims. Furthermore, the present invention is not limited by numerical limitations described about the above-mentioned embodiments.

What is claimed is:

1. An electrophotographic recording device using different color toners, comprising:
   a color matching processing unit which performs color matching processing including color slippage correction of different color images;
   an automatic color matching mode processing unit which controls the color matching processing unit when conditions beforehand decided in the state that an automatic correction mode is set up are realized; and
   a manual color matching mode processing unit which controls the color matching processing unit when said manual color matching mode processing unit recognizes an operator's manual color matching instructing operation in the state that a non-correction mode is set up,
   wherein the automatic color matching mode processing unit comprises a pre-printing correction mode, a periodic correction mode, and a comnosite correction mode including the pre-printing correction mode and the periodic correction mode, any one of which is selected by onerator's operation.

2. An electrophotographic recording device comprising:
   a belt unit which absorbs a recording sheet thereon and feeds it at a constant speed;
   electrostatic recording units, arranged along the direction of the feed of the recording sheet, which form latent images corresponding to image data by optical scanning of exposure devices onto rotating photosensitive drums, developing the latent images with toner components having different colors, and then transferring the developed images onto the recording sheet on the belt unit;
   a color matching processing unit which performs color matching processing including color slippage correction of different color images;
   an automatic color matching mode processing unit which controls the color matching processing unit when conditions beforehand decided in the state that an automatic correction mode is set up are realized; and
   a manual color matching mode processing unit which controls the color matching processing unit when said manual color matching mode processing unit recognizes an operator's manual color matching instructing operation in the state that a non-correction mode is set up,
   wherein the automatic color matching mode processing unit comprises a pre-printing correction mode, a periodic correction mode, and a composite correction mode including the pre-printing correction mode and the periodic correction mode, any one of which is selected by operator's operation.

3. The device according to claim 1, wherein when the automatic color matching mode processing unit recognizes selection of the pre-printing correction mode by the operator, said automatic color matching mode processing unit controls the color matching processing unit before start of printing in the case of receipt of a printing request.

4. The device according to claim 1, wherein when the automatic color matching mode processing unit recognizes selection of the periodic correction mode by the operator, said automatic color matching mode processing unit controls the color matching processing unit, in a printing wait state, whenever elapsed time Tw from the preceding color matching processing reaches a given periodic time n.

5. The device according to claim 1, wherein in the case that the automatic color matching mode processing unit recognizes selection of the composite correction mode by the operator, at the time of receiving a printing request said automatic color matching mode processing unit controls the color matching processing unit before start of printing; and said automatic color matching mode processing unit controls the color matching processing unit, in a printing wait state, whenever elapsed time Tw from the preceding color matching processing reaches a given periodic time n.

6. The device according to claim 3, wherein in the case that the automatic color matching mode processing unit recognizes selection of the pre-printing correction mode by the operator, said automatic color matching mode processing unit starts printing without controlling the color matching processing unit when said automatic color matching mode processing unit receives the printing request and elapsed time Tw from the preceding color matching processing is below a given time m; and when the elapsed time Tw is not less than the given time m, the automatic color matching mode processing unit controls the color matching processing unit and subsequently starts printing.

7. The device according to claim 1, wherein when the manual color matching mode processing unit recognizes the operator's manual color matching instructing operation, said manual color matching mode processing unit controls the color matching processing unit forcibly even if the automatic mode of the automatic color matching mode processing unit is selected.

8. The device according to claim 1, wherein the color matching processing unit performs density correction of the respective color images designated by the operator, as well as color slippage correction of the different color images.

9. The device according to claim 1, which comprises an operator operation panel for performing mode selection operation for the automatic color matching mode processing unit, and manual color matching designation operation for the manual color matching processing unit.

10. The device according to claim 1, which comprises an interface processing unit which performs a mode selection operation for the automatic color matching mode processing unit through a screen of a terminal of an external unit connected to a network, and receives and processing a request of manual color matching designation operation for the manual color matching processing unit.

* * * * *